(12) United States Patent
Odell

(10) Patent No.: US 6,417,839 B1
(45) Date of Patent: Jul. 9, 2002

(54) SYSTEM FOR POSITION AND ORIENTATION DETERMINATION OF A POINT IN SPACE USING SCANNING LASER BEAMS

(75) Inventor: Don Odell, Milton, VT (US)

(73) Assignee: Ascension Technology Corporation, Burlington, VT (US)

( * ) Notice: Subject to any disclaimer, the term of this patent is extended or adjusted under 35 U.S.C. 154(b) by 0 days.

(21) Appl. No.: 09/315,148

(22) Filed: May 20, 1999

(51) Int. Cl.[7] .............................................. G09G 05/08
(52) U.S. Cl. ...................... 345/158; 345/157; 345/159; 345/162; 345/166; 345/207
(58) Field of Search ................................ 345/158, 165, 345/154, 162, 167, 173, 207; 356/152, 375

(56) References Cited

U.S. PATENT DOCUMENTS

| | | | |
|---|---|---|---|
| 4,896,962 A | * | 1/1990 | Menn et al. ................ 356/152 |
| 5,574,479 A | | 11/1996 | Odell |
| 5,737,083 A | * | 4/1998 | Owechko et al. ........... 356/375 |
| 5,767,960 A | | 6/1998 | Orman |
| 5,729,475 A | * | 3/1999 | Romanik, Jr. ................ 345/158 |
| 5,884,239 A | * | 3/1999 | Romanik, Jr. ................ 345/158 |

* cited by examiner

Primary Examiner—Richard Hjerpe
Assistant Examiner—Ali Zamani
(74) Attorney, Agent, or Firm—H. Jay Spiegel

(57) ABSTRACT

A system for position and orientation determination of a point in space employs, in a preferred embodiment, three scanning laser beams that rotate at a high rate of speed within a prescribed space. At least two of the beams are polarized and a sensor with two or three detectors is located within the prescribed space. In each embodiment, at least one of the detectors has an unobscured, clear view of all of the scanning light beams at all times and at least another of the sensors is partially obscured. In the preferred embodiments, at least one sensor is polarized as well. Computer means is provided to facilitate calculation of position and orientation of a point within the prescribed space.

60 Claims, 15 Drawing Sheets

Position reference (+) is detector plane

Spot position is corrected for X,Y offset to yield detector center

Azimuth Detector

Elevation Detector

Spot position is corrected for X,Y offset to yield detector center

Yaw Detector

Pitch Detector

SYSTEM FOR POSITION AND ORIENTATION DETERMINATION OF A POINT IN SPACE USING SCANNING LASER BEAMS

BACKGROUND OF THE INVENTION

The present invention relates to a system for position and orientation determination of a point in space using scanning laser beams. The present invention has applications in such diverse areas as medicine, aerospace and virtual reality systems. Within these realms, the present invention is contemplated for use for position and orientation monitoring of surgical instruments, cockpit-based helmet-mounted sighting mechanisms, and augmented reality computer-aided-design systems, among others.

It is known to measure position and orientation using multiple scanning beams in a reference frame. It is also known to use detection of polarized light in position and orientation measuring systems. However, Applicant is unaware of any system that uses multiple scanning beams, at least some of which are polarized, and detectors, at least some of which are associated with polarizing filters in a position and orientation determination measurement system.

Applicant's prior patent U.S. Pat. No. 5,574,479 (Odell) discloses an optical system for determining the roll orientation of a remote unit relative to a base unit. In Odell, one or more beams are emitted from a fixed base unit. None of these beams is movable in any direction. The beams illuminate the entire work area simultaneously. In Odell, light emanating from the fixed source is polarized and this polarized light is used to determine the roll angle of the remote unit with respect to the base unit through the use of polarization of one or more of the detectors. The fixed emitters of Odell illuminate the entire work area simultaneously which results in the creation of ambient reflections that can alter the sensed angles of incidence of light emanating from the fixed sources due to such reflections occurring off different walls and surfaces of the work area. The present invention differs from the teachings of Odell as contemplating a plurality of rotatable source beams polarized to prescribed degrees with a movable object comprising a photodetector having at least one polarized detector means and wherein orientation including azimuth, elevation and roll may be computed.

U.S. Pat. No. 5,767,960 to Orman discloses optical 6D measurement system with three fan-shaped beams rotating around one axis. While Orman does disclose the concept of movable beams of light, Orman fails to teach or suggest the use of angle of polarization or angle of incidence as a means to facilitate accurate measurements of orientation.

SUMMARY OF THE INVENTION

The present invention relates to a system for position and orientation determination of a point in space using scanning laser beams. The present invention includes the following interrelated objects, aspects and features:

(1) In a first aspect, the present invention contemplates a base unit having three scanning laser beam light sources that rotate together emanating from approximately the same point. The resulting beams are fan-shaped. In practice, due to the physical structure of the base unit, these light sources are slightly spaced from one another, however, at distances beyond about 10 cm from the sources, inaccuracies arising from this spacing are small and can be accounted for through knowledge of source positions. (2) Each of the beams is appropriately collimated such that, for example, at one meter distance from the source, the width of the beam is no more than 1 mm. For example, at two meters distance from the source, the beam width does not exceed 2 mm. As explained above, each beam is polarized. Thus, for example, the beams may be polarized at 0° polarization, 45° polarization, and 90° polarization, respectively. Other polarization relationships between the beams may also be suitably employed.

(3) In the preferred embodiment, the beams may rotate quite rapidly, as fast as 90 times per second or 5400 r.p.m. Thus, 90 measurements per second may be taken, thereby resulting in high bandwidth in measurement.

(4) The present invention contemplates a number of different embodiments of detector configuration. In a preferred embodiment, illustrated in FIG. 3, three detectors are employed including a first detector that is always exposed to incident light, a second partially shaded polarized detector, and a third partially shaded unpolarized detector.

(5) In a second embodiment, illustrated in FIG. 5, three detectors are employed, a first detector that is polarized and always exposed to light, and second and third partially shaded unpolarized detectors.

(6) In a third embodiment, illustrated in FIG. 6, three detectors are employed, a first unpolarized detector always exposed to light, a second partially shaded detector polarized in a first orientation, and a third partially shaded detector polarized in a second orientation.

(7) In a fourth embodiment, illustrated in FIG. 7, three detectors are employed, a first unshaded, unpolarized detector always exposed to light, a second partially shaded unpolarized detector, and a third partially shaded polarized detector. The third detector is polarized by virtue of a polarization filter mounted on the aperture overlying the detectors.

(8) Concerning each of the embodiments described herein, each position sensing detector may be of a particular design such as those that are disclosed in detail in FIGS. 8–16. These position sensing detectors measure the angle of incidence of impinging laser beams and may or may not use polarized beams to measure roll. Thus, FIG. 8 discloses a position sensing detector (PSD) having a split four quadrant detector and with an aperture allowing light from a source of light to pass therethrough and impinge on the active area of the detector whereupon the position of the light spot on the active area of the detector may be detected and conveyed. The tetralateral position sensing detector of FIG. 9 is similar to that of FIG. 8 but includes the further provision of a focusing lens.

(9) FIG. 10 shows single axis tetralateral position sensing detectors that measure position and angle of incidence in a single plane. Under normal circumstances, a plurality of such detectors would be provided in adjacency to one another for each desired measurement.

(10) FIG. 11 shows pitch and yaw detecting sawtooth-type position sensing detectors wherein, in each case, two single axis angle of incidence detectors are mounted orthogonally. FIG. 12 shows different embodiments of position sensing detectors including, in each case, an active area comprised of a coded pattern with an aperture spaced above the active area and also including a coded pattern. FIG. 13 shows diagrams depicting an intensity resolver aspect of the position sensing detectors of the present invention including depiction of a zone of uncertainty.

(11) The detection of light from the moving beams of light may also employ an auxiliary detector spaced from the other detectors by a known distance sufficient to resolve a position vector connecting position rays to each detector (FIG. 14).

In a further modification, two detectors may be spaced in the manner contemplated in FIG. 14 with a third spaced detector being used to compute azimuth. If desired, the present invention may be simplified through the use of only two adjacent position sensing detectors which may be employed to determine only one or two degrees of orientation such as, for example, elevation or elevation and roll (FIGS. 16 and 17, respectively).

(12) Suitable computer means is employed to control the present invention in its various embodiments. The computer means controls rotation of a motor that rotates the light beams, and a sensor senses motor rotation and provides data indicating motor rotation to the computer means. The computer means controls activation of the light beams and receives data from the sensors which it uses to calculate position and orientation. A display is provided permitting display of position and orientation of a point within a prescribed space.

Accordingly, it is a first object of the present invention to provide a system for position and orientation determination of a point in space using scanning laser beams.

It is a further object of the present invention to provide such a system wherein three laser beams continuously rotate at a high rate of rotation with each such beam being polarized at a unique angle of polarization.

It is a still further object of the present invention to provide such a system including position sensing detectors designed to receive and detect the beams emanating from the source thereof.

It is a yet further object of the present invention to provide such a system wherein the sensor includes position sensing detectors, at least one of which is polarized at a prescribed angle and wherein at least one position sensing detector is always exposed to light from the sources, and others of the position sensing detectors are at least partially obscured therefrom.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
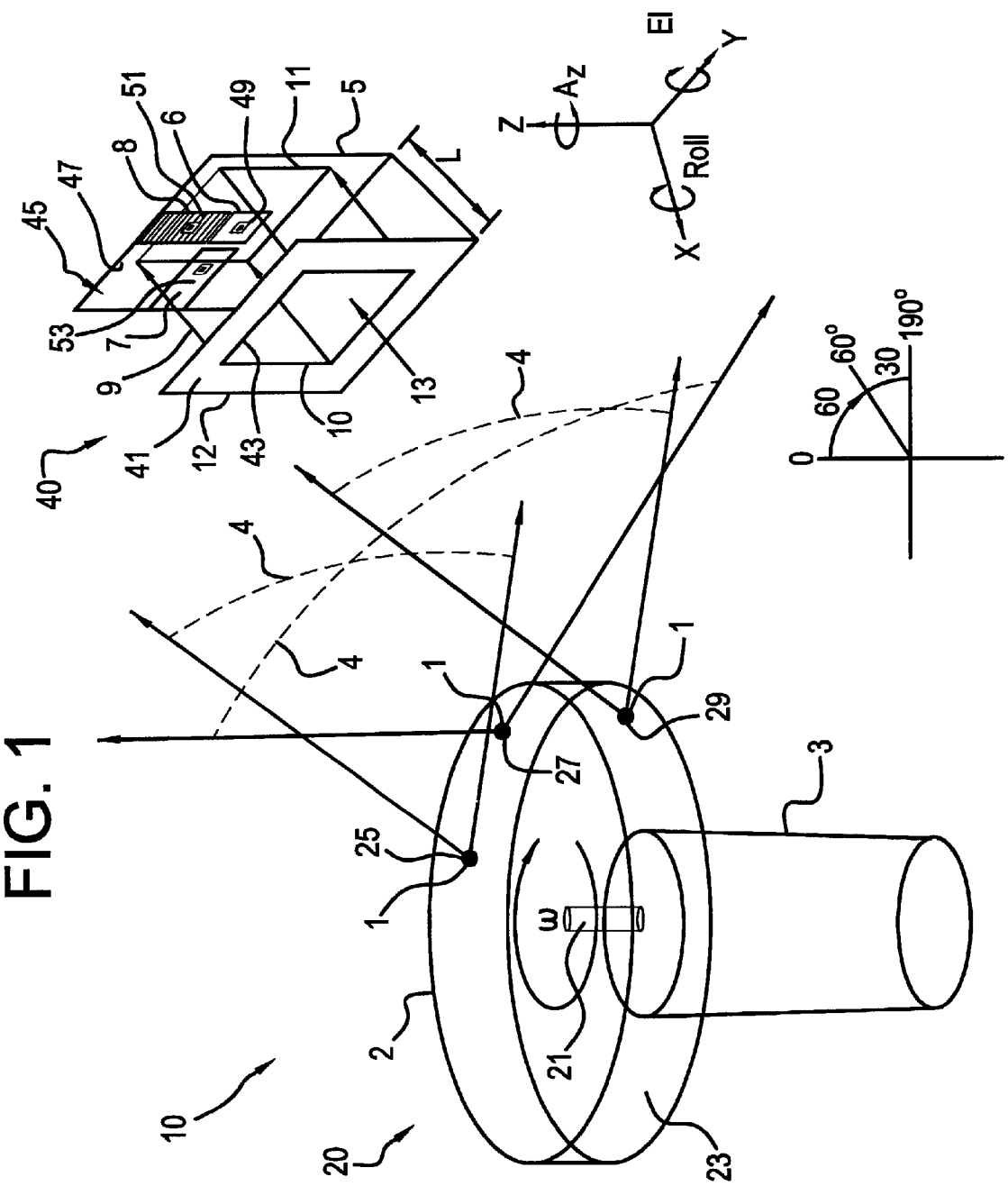
FIG. 1 shows a perspective view of a preferred embodiment of the present invention showing a source of three rotating light beams as well as a sensor within a space in which the light beams travel.

With reference, first, to FIG. 1, a system in accordance with the teachings of the present invention is generally designated 10 by the reference numeral 10 and is seen to include a source 20 of light and a movable sensor 40.

The source 20 of light consists of a rotating transmitter having an axis of rotation 21 on which is rotatably mounted a carrier 23 carrying means such as is well known in the art for generating beams of light, including three laser beam generators 25, 27 and 29. In one preferred embodiment, with the axis 21 defining 90°, the beams emanating from the sources 25 and 29 are parallel to the axis 21 and separated by a known distance. In the same preferred embodiment, the beam emanating from the source 27 is skewed at 30° with respect to the axis 21. In other words, a plane extending angularly upwardly in the view of FIG. 1 makes an angle of 60° with respect to the plane in which the beams emanating from the sources 25 and 29 are contained.

Figure 2:
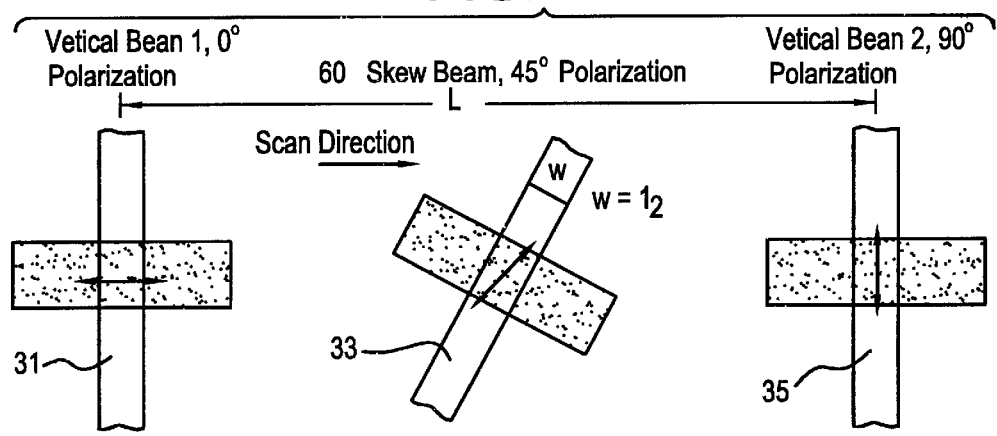
FIG. 2 shows a schematic representation of the angles of divergence and polarization between the three laser light beams.

With reference to FIG. 2, the beam emanating from the source 25 is designated by the reference numeral 31, the beam emanating from the source 27 is designated by the reference numeral 33, and the beam emanating from the source 29 is designated by the reference numeral 35. As seen in FIG. 2, in one preferred configuration of the present invention, the beam 31 is polarized at an angle of 0°, the beam 33 is polarized at an angle of 45°, and the beam 35 is polarized at an angle of 90°. The different degrees of polarization of the beams 31, 33 and 35 allow the detector 40 to distinguish between the beams 31, 33 and 35.

With further reference to FIG. 2, the beams 31, 33 and 35 are collimated so that their beam widths remain relatively constant as the distance from the source increases, in each case. In the preferred embodiment, each beam has a width of no more than 1 millimeter at a distance of 1 meter from the source and a beam width of no more than 2 millimeters, 2 meters from the source.

With reference back to FIG. 1, the movable sensor 40 is seen to include a first plate 41 having an aperture 43 allowing light from the beams 31, 33 and 35 to pass therethrough, and a second plate 45 spaced a prescribed distance from the plate 41 and having a surface 47 on which three detectors 49, 51 and 53 are mounted.

Figure 3:
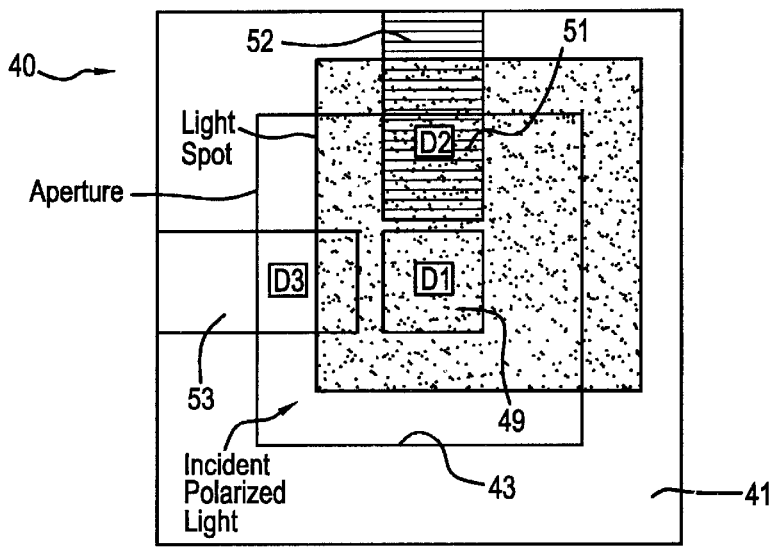
FIG. 3 shows a front view of a preferred embodiment of sensor.

With reference to FIG. 3, the configuration of the movable sensor 40 will be better understood. In particular, as should be understood from FIG. 3, the detector 49 is positioned such that it is always fully exposed to light through the aperture 43. The detector 49 is used for position detection and intensity normalization of the three scanning beams. The detectors 51 and 53 are partially obscured. The detector 51 is polarized at 0° as schematically depicted by the horizontal lines 52. In the preferred embodiment of movable sensor 40, the detector 49 measures position while the detector 51 measures pitch and roll and the detector 53 measures yaw. The detector 51 is able to measure roll because, due to its polarization, the strength of the signal varies with the relative rotation between the sensor 40 and the source 20. With the system preprogrammed with knowledge as to the angle of polarization of the beams 31, 33 and 35 and with the angle of polarization of the detector 51, as well as with the sequence of the beams 31, 33 and 35, it is easy to use the relations between the angles of polarization of the beams 31, 33 and 35 on the one hand, and of the detector 51 on the other hand, to make accurate determinations of roll angle of the sensor 40 with respect to the axis 21 of the source 20, particularly given the rapid speed of it, rotation of the carrier 23 about the axis 21.

Figure 4:
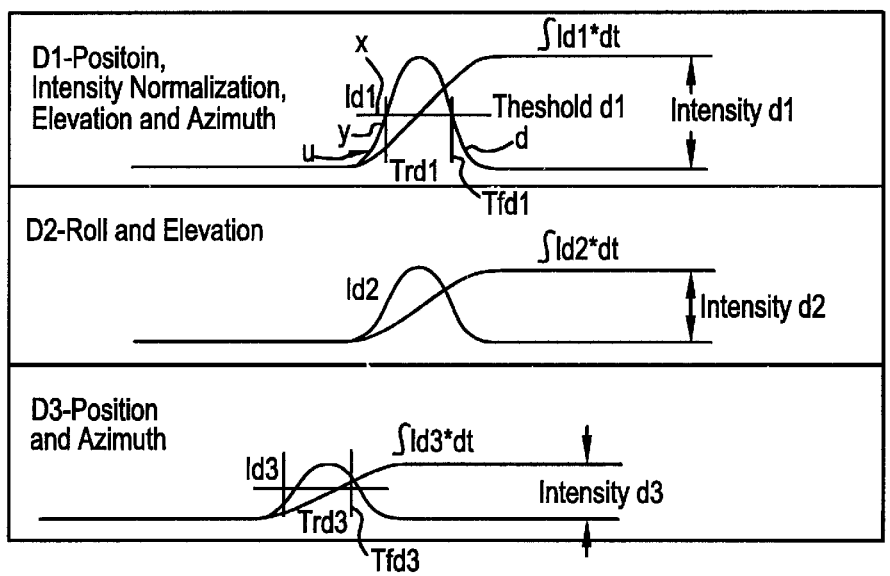
FIG. 4 shows a schematic representation of the signal processing of the detector illustrated in FIG. 3.

FIG. 4 shows graphs of the calculation scheme for employing the detectors 49, 51 and 53 in measuring the different parameters of position and orientation of the movable sensor 40. In the graph of FIG. 4, the detector 49 is identified by "D1", the detector 51 is identified by "D2", and the detector 53 is identified by "D3". As should be understood from FIG. 4, the system measures the upward and downward slopes of a pulse corresponding to rotation of a beam past a sensor at the level when the intensity increases beyond a threshhold intensity on the up-slope and when the intensity crosses below the same intensity on the down-slope. This is particularly understood from the vertical line Trd1 at the upper portion of FIG. 4 defining a point X where the up-slope U crosses the threshhold line T and with reference to the vertical line Tfd1 that crosses the curve shown where the down-slope d crosses the line T. The beam crossing times of 49 (D1) and 53 (D3) are used to compute position, while the signal integrals of detectors 49, 51, and 53 form the intensity signals used for orientation calculation.

Figure 5:
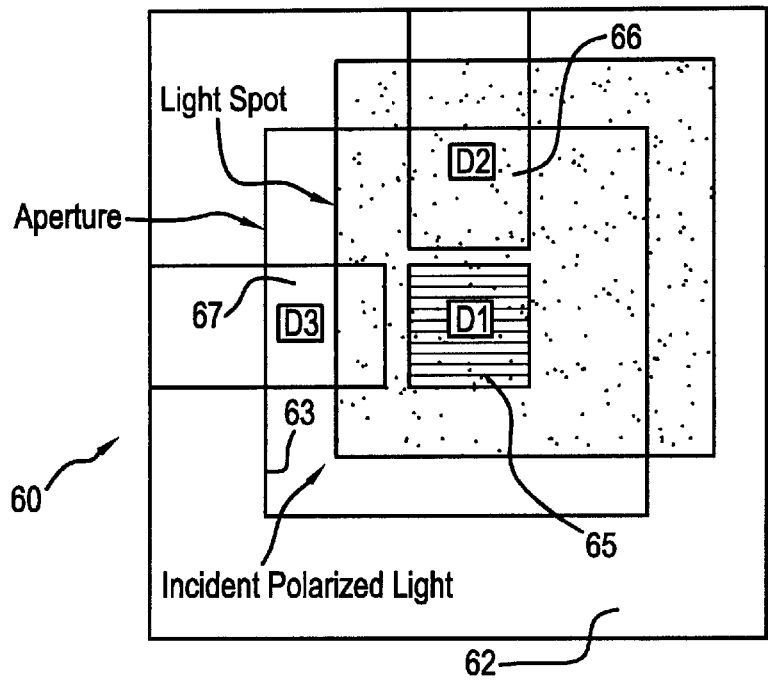
FIGS. 5, 6 and 7 show three alternative configurations for sensors in accordance with the teachings of the present invention.
Figure 6:
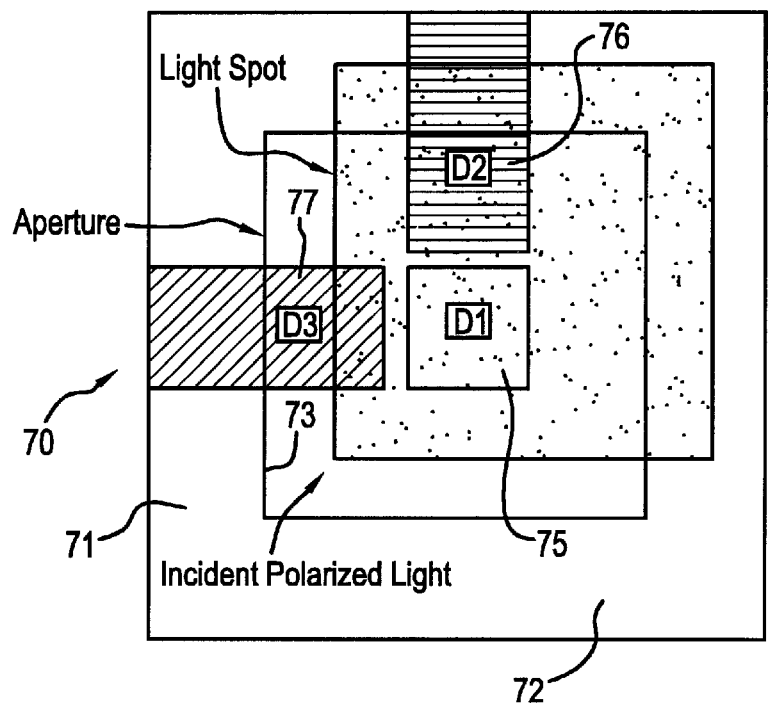
Figure 7:
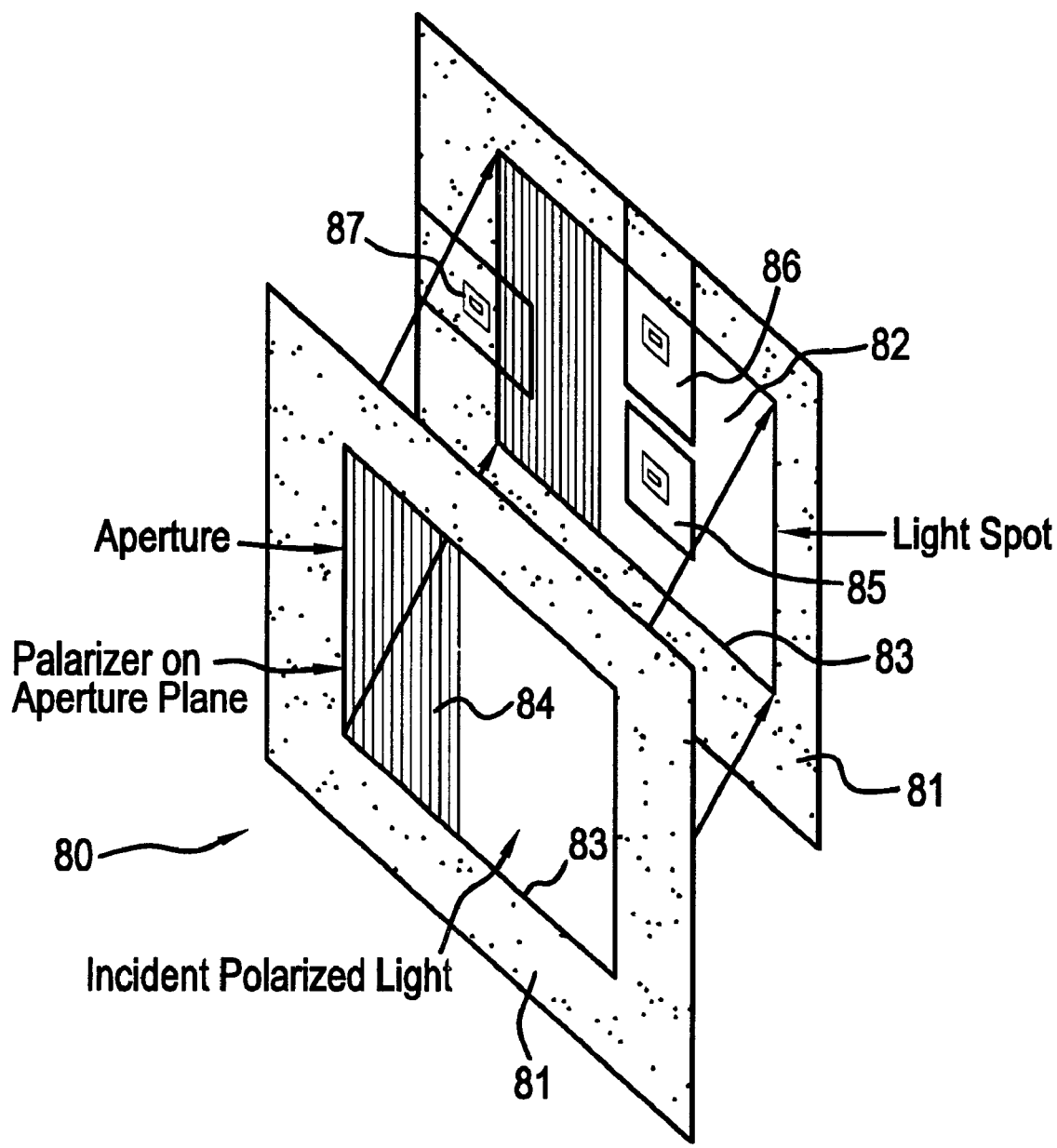

FIGS. 5, 6 and 7 show three alternative constructions for sensors in accordance with the teachings of the present invention. Thus, with reference to FIG. 5, a movable sensor 60 is seen to include a first plate 61 covering a second plate 62, with the first plate 61 having an aperture 63 allowing light to pass therethrough. The plate 62 carries three detectors 65, 66 and 67, also identified in the figure by the identifiers D1, D2 and D3, respectively. The 33 detector 65 is always exposed to light through the aperture 63 and is also polarized at an angle of 90° as schematically represented by the horizontal lines thereon. The detectors 66 and 67 are each partially exposed to light through the aperture 63 and are unpolarized.

The movable sensor 70 depicted in FIG. 6 includes a first plate 71 and a second plate 72, with the first plate 71 having an aperture 73 therethrough. The plate 72 includes detectors 75, 76 and 77 mounted thereon and also depicted by the identifiers D1, D2 and D3, respectively. In the movable sensor 70, the detector 75 is always exposed to light through the aperture 73 and is unpolarized. The detector 76 is partially exposed to light through the aperture 73 and is polarized at a polarization angle of 90° as schematically depicted by the horizontal lines thereon. The detector 77 is partially exposed to light through the aperture 73 and is polarized at an angle of polarization of 45° as schematically represented by the obliquely disposed lines thereon.

FIG. 7 shows a further example of a movable sensor 80 having a front plate 81 depicted twice in the figure as should be understood therefrom. A rear plate 82 is covered by the front plate 81 with the front plate 81 having an aperture 83 partially obscured by a polarizing filter 84 polarized at an angle of 0° as depicted by the vertical lines schematically disposed thereon. The rear plate 82 includes three detectors, designated by the reference numerals 85, 86 and 87 and also by the identifiers D1, D2, and D3, respectively. The detector 85 is always exposed to light through the aperture 83 while the detectors 86 and 87 are only partially exposed to light through the aperture 83. As should be understood from FIG. 7, none of the detectors 85, 86 or 87 is polarized, 4. however, the polarizing filter 84 directly overlies that portion of the detector 87 that protrudes in alignment under the aperture 83. Thus, the detector 87 is, in fact, polarized by virtue of the polarizing filter 85 overlying a portion of the detector 87. The detector 85 (D1) measures position from light beam times of arrival and measures relative light beam intensities which are used to compute elevation using detector 86 (D2) while roll and azimuth are measured using detector 87 (D3). The calculations described herein regarding the embodiment of FIG. 3 are used here as well.

FIGS. 8a, 8b, 8c and 8d depict specific details of a position sensing detector such as may be used in accordance with the teachings of the present invention, particularly as one or more of a position sensing detectors illustrated, schematically, in association with the movable sensors 40, 60, 70 and 80.

Figure 8A:
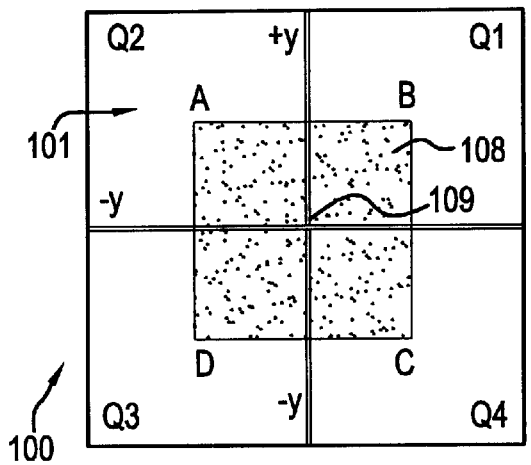
FIGS. 8a–8d show various aspects of a first kind of position sensing detector usable in accordance with the teachings of the present invention.
Figure 8B:
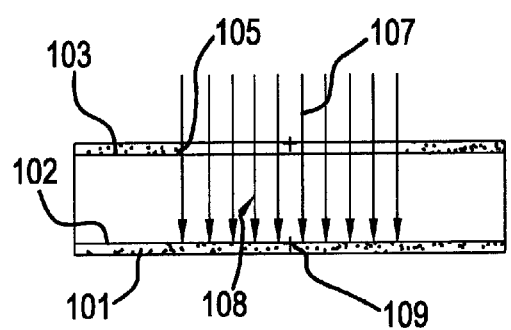

In FIGS. 8a–8d, a position sensing detector is generally designated by the reference numeral 100 and is seen to include an active area 101 composed of four quadrants including an upper left-hand quadrant A covering coordinates where the Y coordinate is positive and the X coordinate is negative, an upper right-hand quadrant B wherein one may find coordinates including positive X coordinates and positive Y coordinates, a lower right-hand quadrant C where one may find positive X coordinates and negative Y coordinates and a lower left-hand quadrant D where one may find negative X and Y coordinates. As seen in FIG. 8b, the active area 101 is covered by a spaced plate 103 having an aperture 105 therein that allows rays 107 of light to pass therethrough and impinge upon the surface 102 to create a light spot 108 as particularly depicted in FIG. 8a. The depiction of the light spot 108 in the views of FIGS. 8a and 8b is merely exemplary and for a situation where the light spot is shining directly over the aperture 105. As is seen in FIG. 8a, the light spot 108 has equal portions in all of the quadrants A, B, C and D, and thus signals emanating from the PSD 100 resulting from a light spot 108 in the position shown in FIG. 8a, in particular, correspond to the central position 109 on the surface 102.

Figure 8C:
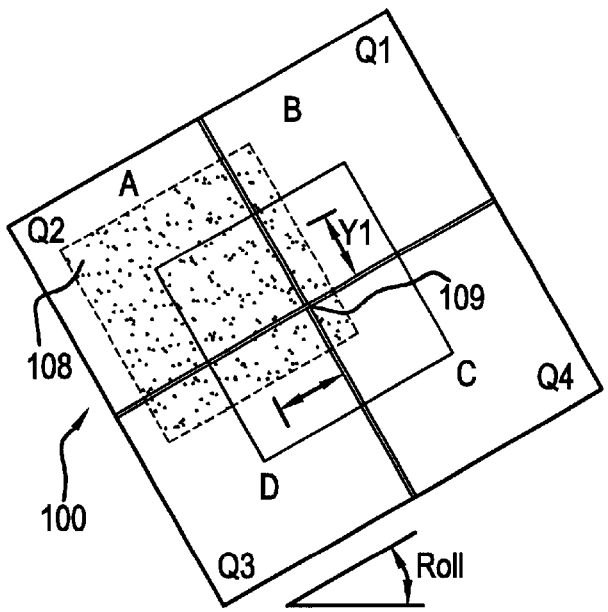
Figure 8D:
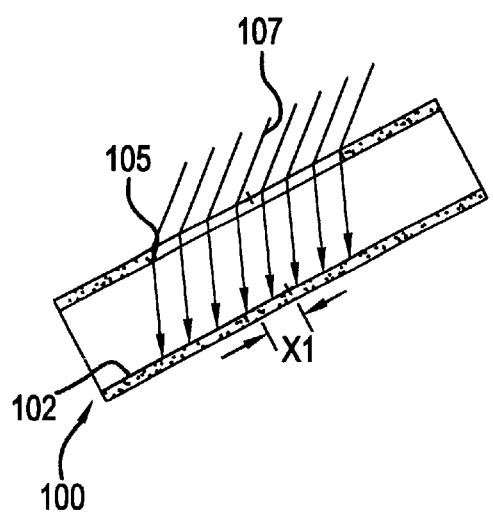

FIG. 8c includes the same PSD 100 as depicted in FIGS. 8a and 8b but shows the light spot 108 in a different position resulting from relative tilting of the PSD 100 with respect to the light source. FIG. 8d shows the light rays 107 as they pass through the aperture 105 and impinge on the surface 102 in a location not symmetrically aligned about the central point 109 on the surface 102. Signals emanating from the PSD 100 as a result of location of the light spot 108 in the position shown in FIGS. 8c and 8d indicates to the user that an angular relationship exists between the PSD 100 and the source of light.

With reference to FIGS. 9a, 9b, 9c and 9d, a further PSD 110 is shown and like structures and elements as compared to the PSD 100 illustrated in FIGS. 8a–8d are depicted using like primed reference numerals and reference letters and the PSD 110 is seen to include quadrants A', B', C' and D1 that correspond in location to the respective locations of the quadrants A, B, C and D in the PSD 100. The central point 109' corresponds to the central point 109 of the PSD 100.

Figure 9A:
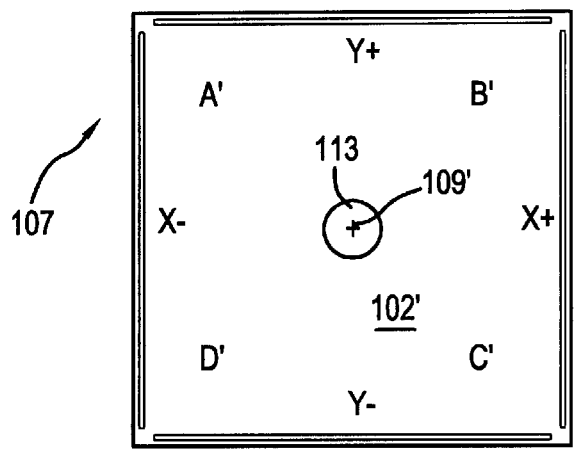
FIGS. 9a–9d show various aspects of a second kind of position sensing detector usable in accordance with the teachings of the present invention.
Figure 9B:
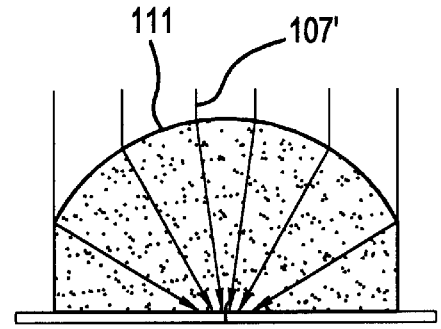
Figure 9C:
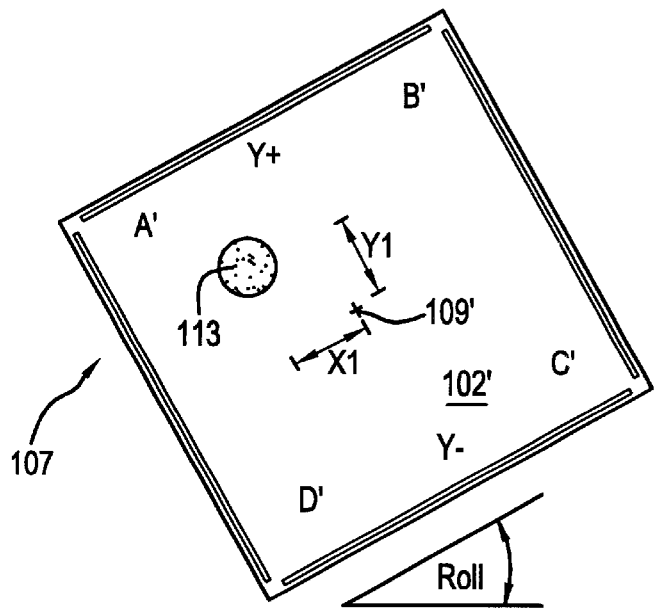
Figure 9D:
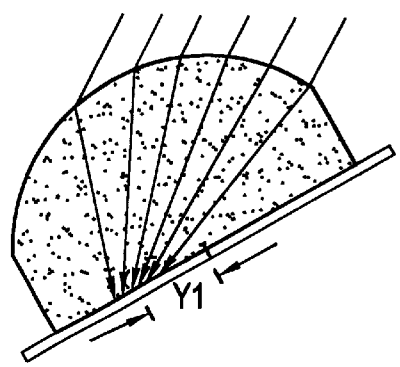

The PSD 110 differs from the PSD 100 mainly through the inclusion of a spherical focusing lens 111 that focuses the light beams 107' into a more focused spot 113 as compared to the somewhat larger spot 108 best seen in FIGS. 8a and 8c. The light spot 113 is seen in FIGS. 9a and 9b to be located as a result of the source of light being directly over the aperture overlying the active area 102' of the PSD 110. FIGS. 9c and 9d show the situation where an angular relationship exists between the source of light and the active area 102' of the PSD 110. In the depiction of FIGS. 9c and 9d, the light spot 113 is seen to have moved to quadrant A' thereof.

Figure 10A:
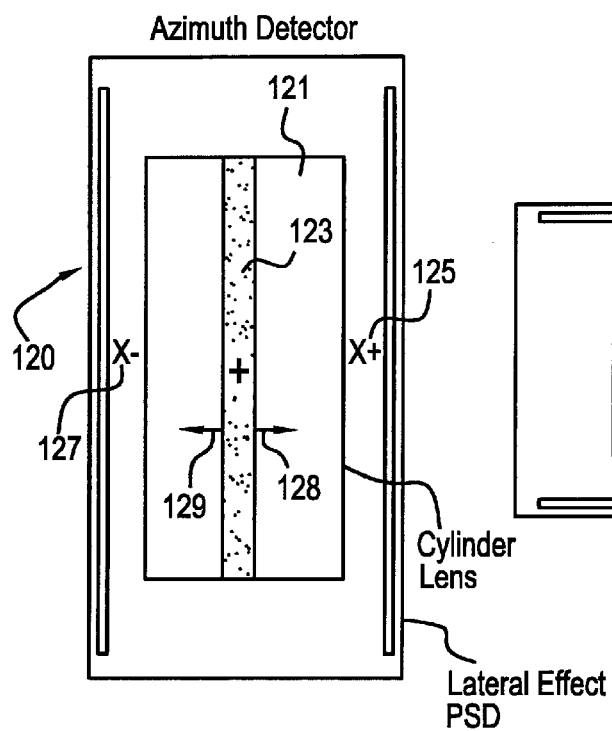
FIGS. 10a–10d show various aspects of single axis position sensing detectors usable in determining azimuth and elevation in accordance with the teachings of the present invention.

FIGS. 10a–10d depict single axis PSDs. As seen in FIG. 10a, a single axis PSD 120 includes a focusing lens 121, preferably cylindrical in structure, that focuses incident light into a linear beam 123. The PSD 120 as depicted in FIG. 10a can provide measurements of one coordinate X from −X to +X with the +X direction being depicted by the reference numeral 125 and with the −X direction being depicted by the reference numeral 127. As should be understood from the arrows 128 and 129, the cylindrical lens 121 focuses the beam of light 123 which may move in the directions of the arrows 128 and 129 depending upon the particular orientation of the PSD 120 with respect to the source of incident light.

Figure 10B:
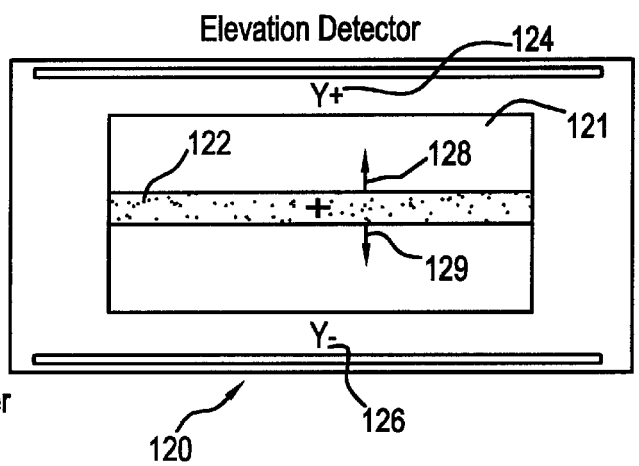

By rotating the PSD 120 90°, one may use it as a Y axis detector as seen with reference to FIG. 10b. As seen in FIG. 10b, the beam 122 that is focused in a linear fashion by the cylindrical lens 121 may move in the directions of arrows 128 and 129 toward the +Y and −Y directions, respectively.

Figure 10C:
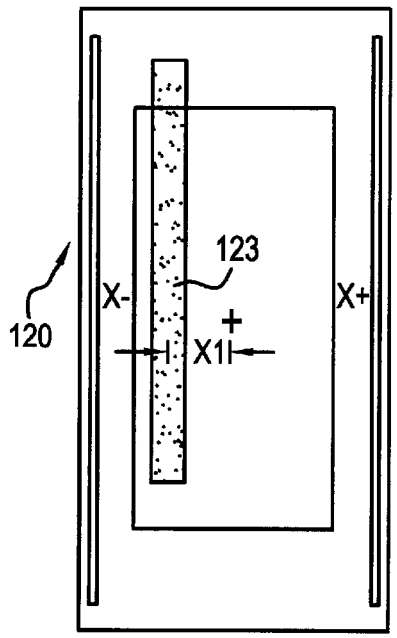
Figure 10D:
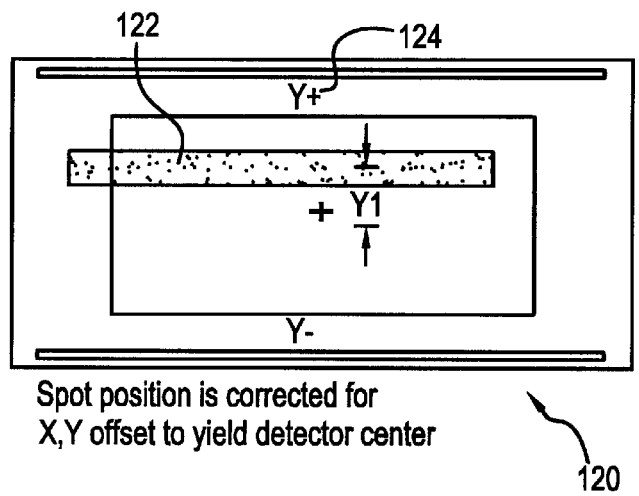

FIG. 10c shows movement of the beam 123 on the active area of the PSD 120 where the source of incident light is not directly aligned over the PSD 120. FIG. 10d shows a similar effect concerning the linear light spot 122 which has moved toward the +Y direction 124 since the source of incident light is not aligned directly over the PSD 120.

Figure 11A:
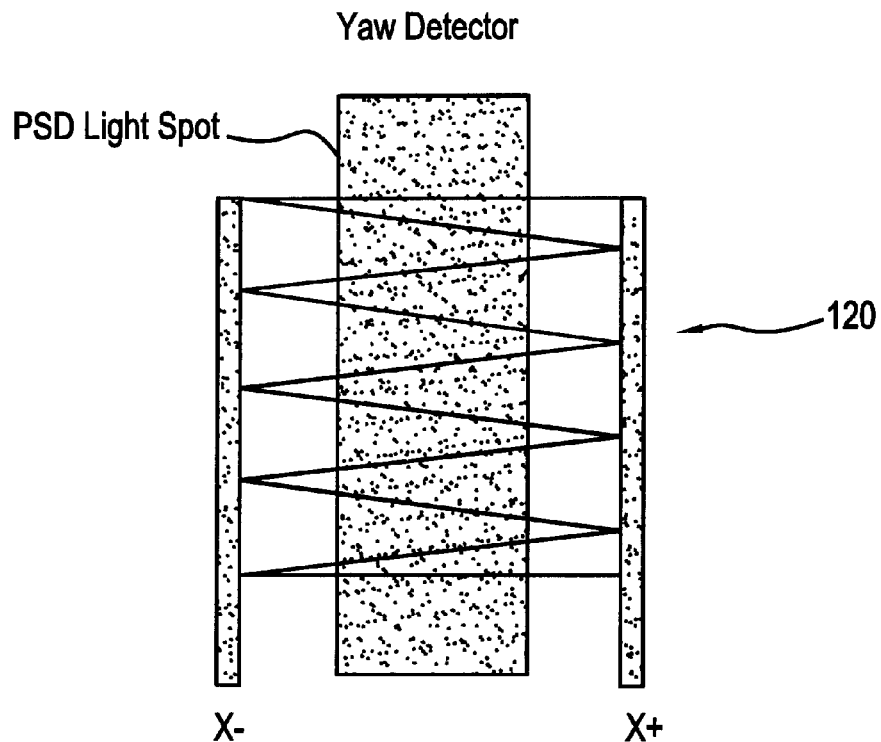
FIGS. 11a and 11b show yaw and pitch detectors, respectively, with each such detector consisting of a pair of spaced single axis detectors such as those illustrated in FIGS. 10a–10d.
Figure 11B:
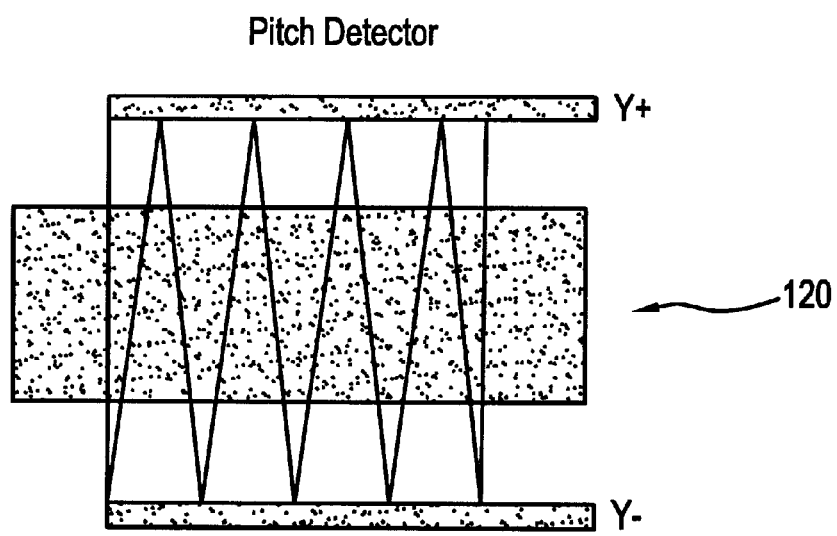

FIG. 11a shows the sawtooth PSD 120 in the orientation shown in FIGS. 10a and 10c used as a yaw detector. FIG. 11b shows the PSD 120 in the orientation depicted in FIGS. 10b and 10d used as a pitch detector. The sawtooth detector PSD 120 is designed to reduce the effect of beam nonuniformity by determining the response over a two dimensional region of the projected light spot.

Concerning the single axis detectors depicted, in particular, in FIGS. 10a–11b, two such detectors may be employed orthogonally related to one another to detect both angles of incidence. Thus, for example, one may employ two such detectors in the configuration illustrated by envisioning combining together FIGS. 10a and 10b in the orientations shown therein.

Figure 12A:
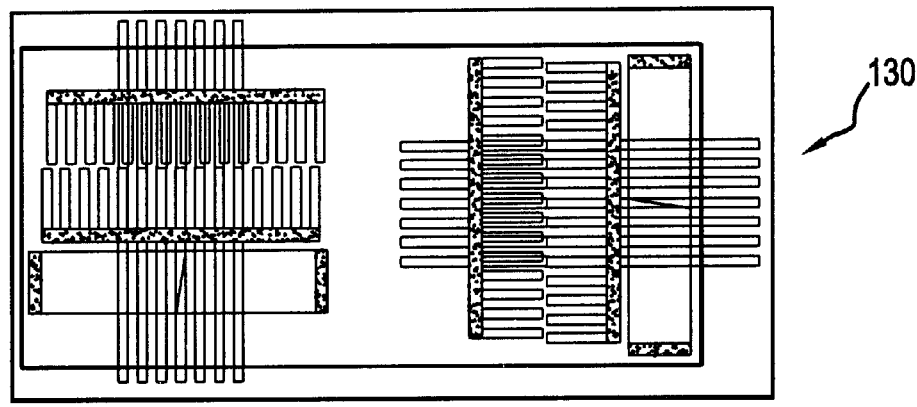
FIGS. 12a–12c depict aspects of position sensing detectors including both the use of a coded pattern and an angled split between detector halves.
Figure 12B:
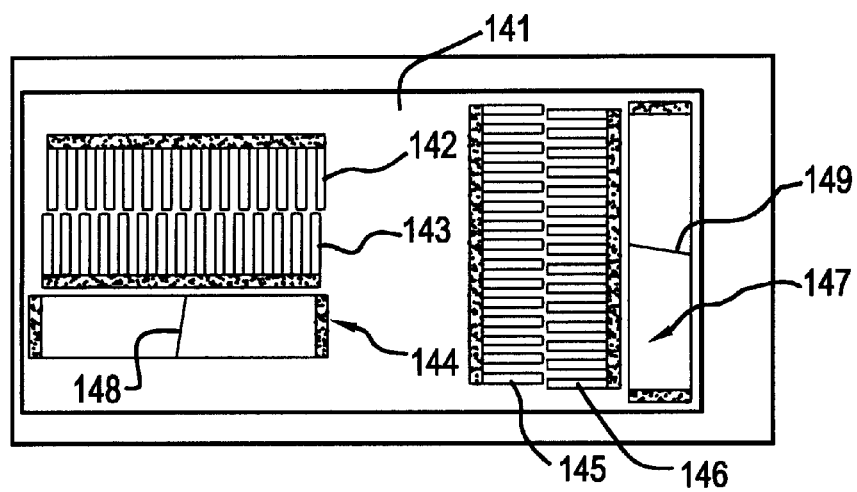
Figure 12C:
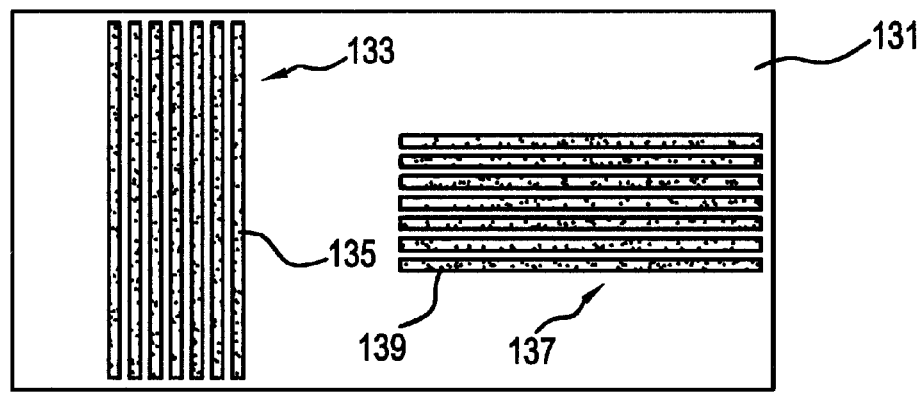

FIGS. 12a–12c depict a further embodiment of PSD generally designated by the reference numeral 130 in FIG. 12a, in particular, and including a first plate 131 having a first set 133 of apertures 135, each of which consists of a thin, vertical slot, and a second set 137 of apertures 139, each of which consists of a thin, horizontal slot.

A second plate 141 carries horizontally disposed detectors 142, 143 and 144 as well as vertically disposed detectors 145, 146 and 147. As seen, in particular, from FIG. 12b, the detectors 142, 143, 145 and 146 have an active surface defined by a series of thin, parallel "teeth" that provide a coded pattern. The horizontally disposed detector 144 and the vertically disposed detector 147 each include an angular split, 148 and 149, respectively. FIG. 12a shows the plate 131 overlying the plate 141 in a prescribed spaced relationship. With knowledge of the spacing therebetween, and due to the coded patterns of the detectors and apertures, increased accuracy results since the associated microprocessor or computer can easily recognize the pattern of a light spot that has passed through the apertures 135, 137 and impinge upon the active areas of the detectors 142, 143, 144, 145, 146 and 147. The PSD 130 also has reduced susceptibility to ambient reflections due to the thin openings through which light may pass.

Figure 13A:
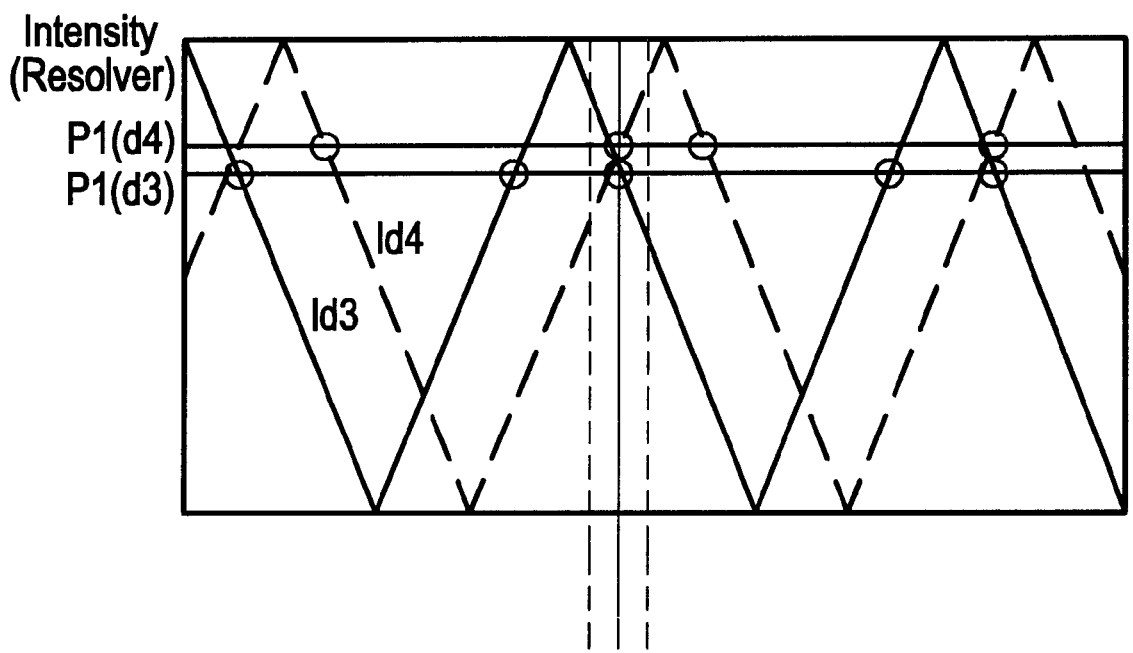
FIGS. 13a and 13b depict graphs of the intensity of light impinging on the detectors illustrated in FIGS. 12a–12c.
Figure 13B:
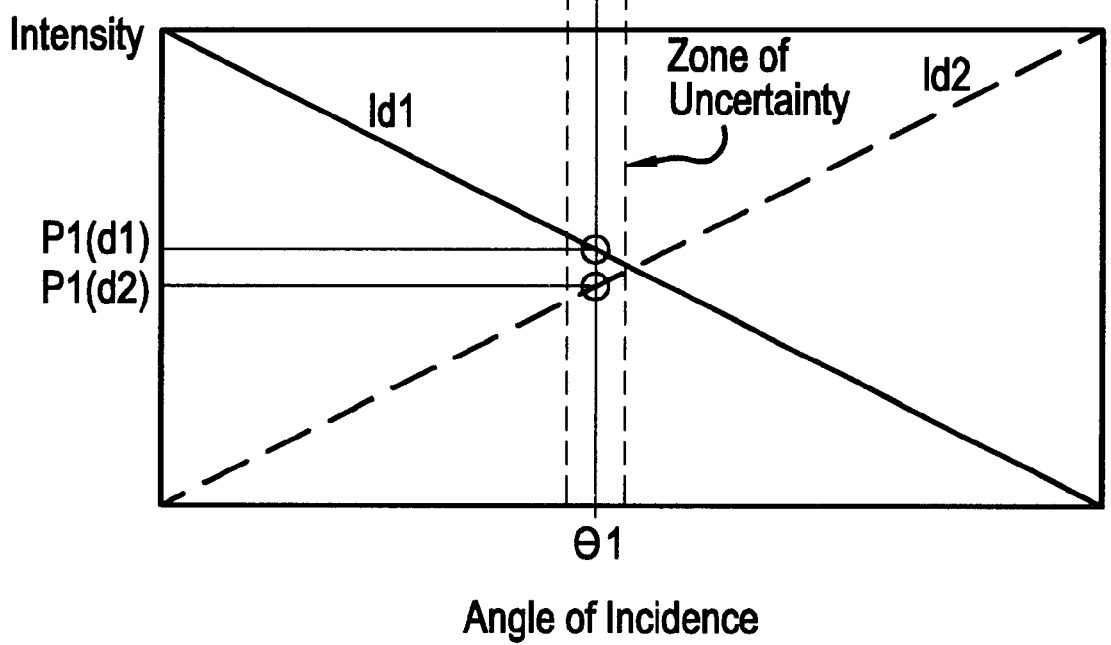

FIG. 13a shows a saw tooth pattern of light intensity that occurs through use of the PSDs 142, 143, 145 and 146. The graph of FIG. 13b depicts the pattern of light that results from use of PSDs 144 and 147 with their respective splits 148 and 149.

Figure 14:
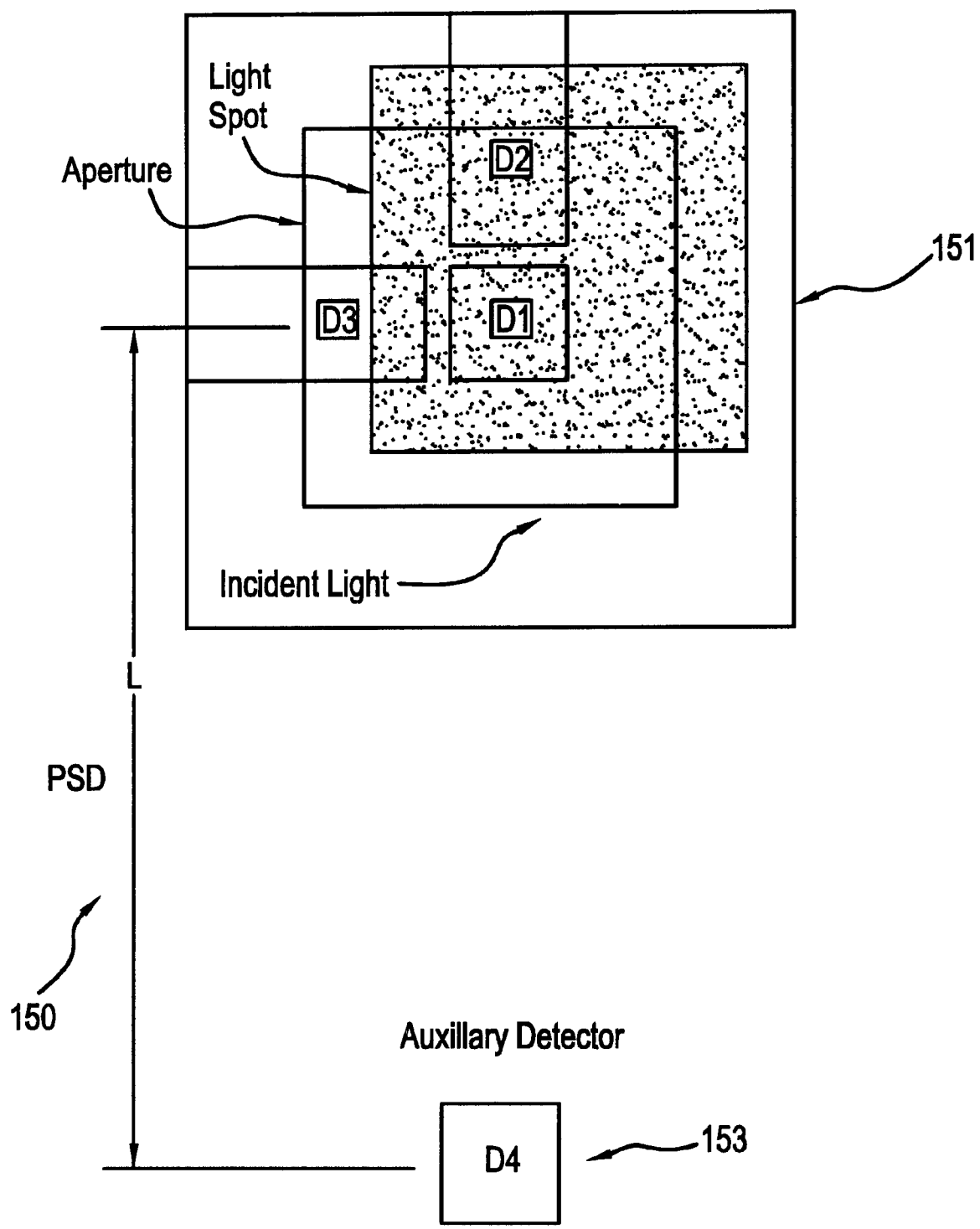
FIG. 14 depicts a further embodiment of detector including a first detector including three position sensing detectors and an auxiliary detector.

FIG. 14 shows a further configuration of PSD generally designated by the reference numeral 150 and includes a first movable sensor 151 and an auxiliary detector 153. The movable sensor 151 may correspond to any of the configurations illustrated with reference to FIGS. 1, 3 and 5–7 and may also take the form of any of the specific PSD embodiments depicted with reference to FIGS. 8–13. In the embodiment illustrated in FIG. 14, the detector D3 of the movable sensor 151 is spaced from the auxiliary detector 153 and is spaced apart by a known distance L sufficient to resolve a position vector connecting position rays to each detector. The detectors D1 and D2 of the movable sensor 151 are used to compute elevation, azimuth is determined from detectors D1 and D3 and roll is determined using position of D1 and D4.

Figure 15:
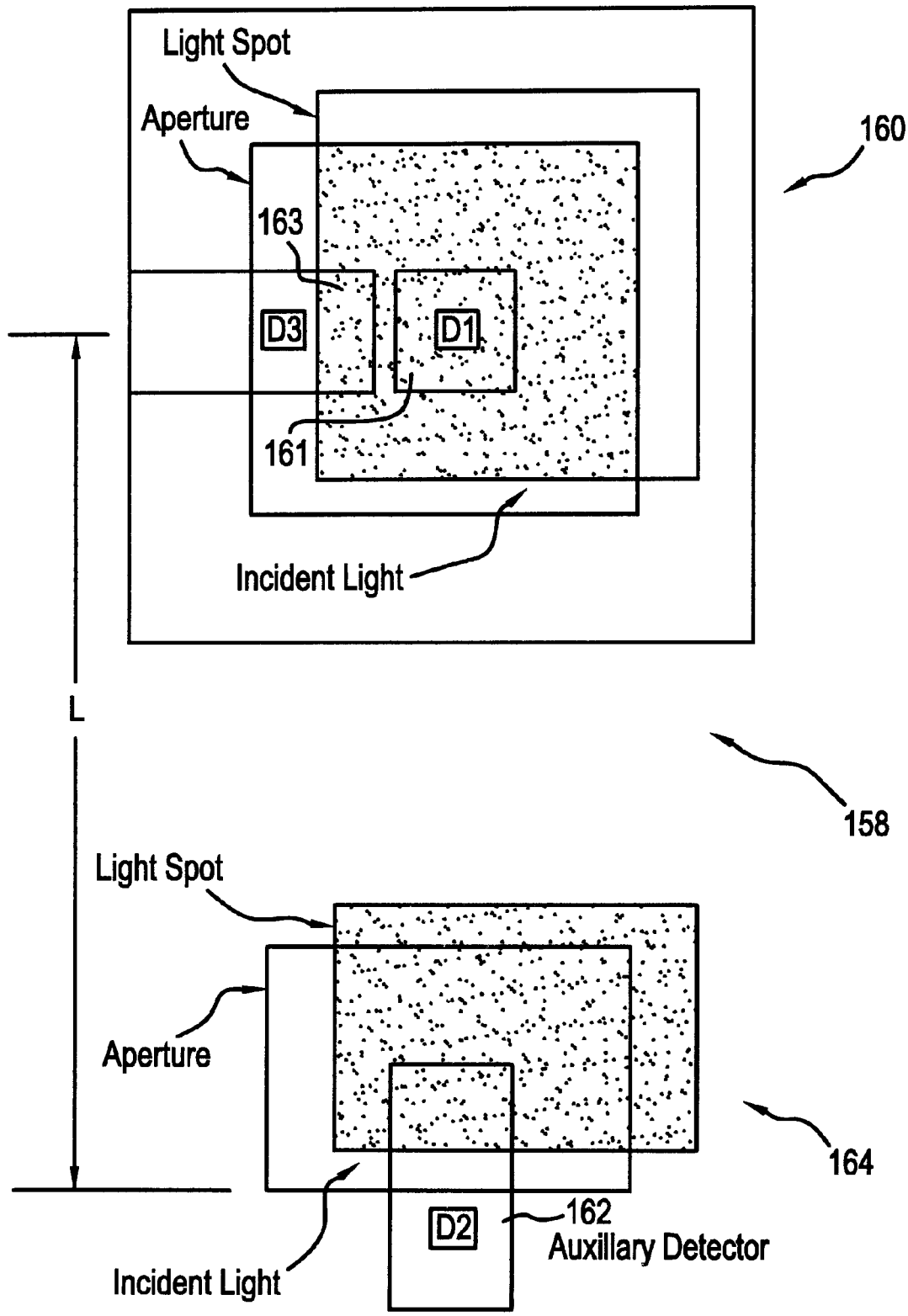
FIG. 15 shows a further modification from that of FIG. 14.

With reference to FIG. 15, a further sensor embodiment 158 is depicted including a first movable PSD 160 that includes detectors 161 (D1) and 163 (D3). An auxiliary PSD 164 includes a detector 162, the center of which is spaced a known distance from the detectors D1 and D3. The sensor 158 incorporating the PSDs 160 and 164 only requires two scanning beam light sources (not shown). The known spacing of the detector elements D2 and D3 is sufficient to permit resolving a position vector connecting position rays to each detector. The detectors D1 and D3 are used to compute azimuth and the detectors D1 and D2 are used to compute elevation and roll. Time of arrival information is used to compute position rays to the detectors D1 and D2 and then calculating let position using known separation of detectors D1 and D2.

Figure 16:
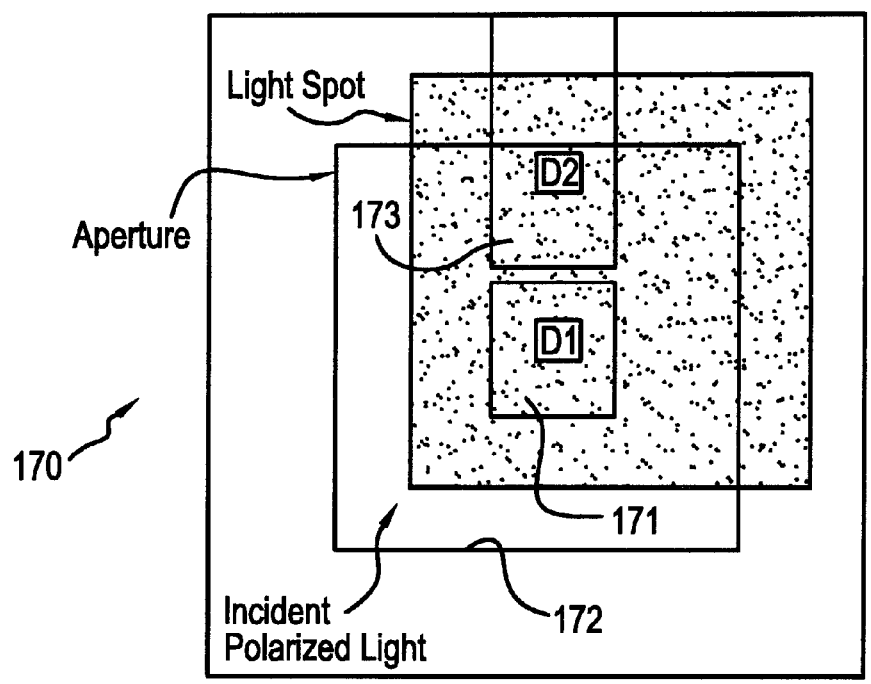
FIGS. 16 and 17 show still further modifications from FIGS. 14 and 15.

FIG. 16 shows a further embodiment of a movable PSD 170 that includes two detectors 171 (D1) and 173 (D2) with the detector 171 always exposed to light through the aperture 172 and with the detector 173 partially exposed to light through the aperture 172. This PSD is used with three scanning fan beams to sense position from detector D1 from light beam times of arrival and relative beam intensity and elevation from partially shaded detector D2.

Figure 17:
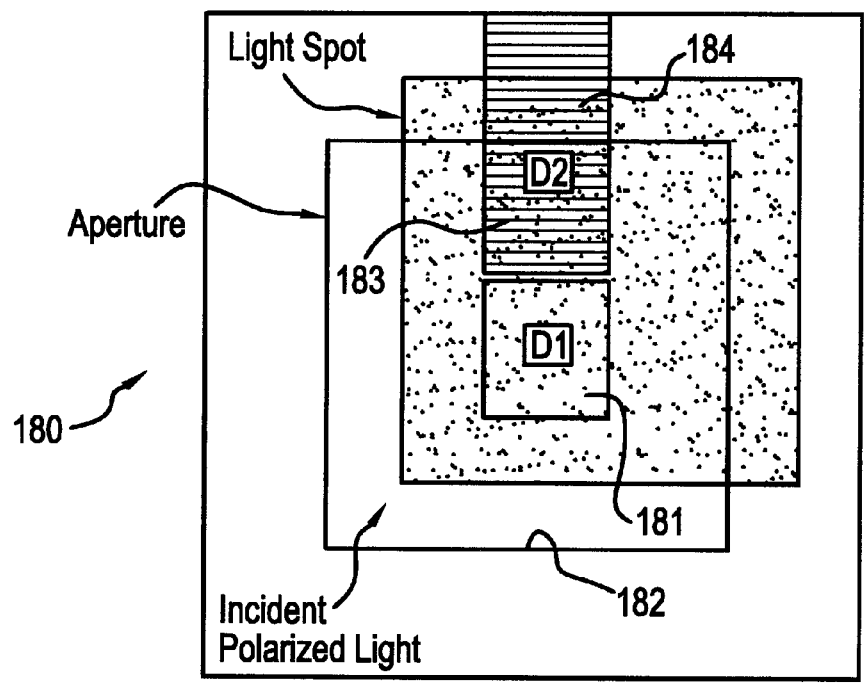

FIG. 17 shows a further embodiment of movable PSD 180 including a first detector 181 (D1) always exposed to light through the aperture 182 and with a second detector 183 (D2) partially exposed to light through the aperture 182 and polarized 90° as depicted by the horizontal lines 184. This PSD is used with three scanning fan beams to sense position from detector D1 from light beam times of arrival and relative beam intensity and elevation and roll from partially shaded detector D2.

Based upon the above description, the manner of operation of the present invention in its various embodiments should be better understood.

With the above description having been made, concerning preferred embodiments of general system configuration as well as of particular PSDs usable therein, it should now be understood that many different types of PSDs may be employed in accordance with the teachings of the present invention to measure time of arrival and intensity of scanning beams for position and orientation determination. The beams emanating from the three sources 25, 27 and 29 scan through the aperture of each PSD projecting a scanned image or spot onto the active area of the PSD. The time of arrival for the three circumferentially spaced laser beams is measured using the position of the shaft 21 as a reference. The quantity measured may be with respect to individual detector elements or it may be more than one element summed together, as better understood with reference to FIGS. 8a–8d. Since the orientation is measured and the sensor or PSD configuration are accurately known, the position of the movable sensor may be computed.

Pitch and yaw of the detector, presuming no correction for actual roll, may be determined by measuring the relative amplitudes of each of the detector portions and using an appropriate PSD calculation equation. The amplitude that is employed for such measurements is the integral of the detector signal since the beams are scanned.

The precise roll of the detector with respect to the plane of rotation of the laser beams may be determined by establishing the planes of polarization of the scanning beams, and the provision of at least one polarized PSD detector element is provided so as to permit measurement of the polarization angle, with different embodiments described above showing different ways to provide polarization to one or more of the PSDs.

Taking the example of the embodiment illustrated in FIGS. 1 and 3, the intensity of each of the three laser beams emanating from the sources 25, 27 and 29, respectively, presuming the degrees of polarization illustrated in FIG. 2, are measured by the detector 49 which has been described hereinabove as always exposed to light from the laser beams through the aperture 43. For small angular differences between the transmitters (laser beams) and detectors, the areas of illumination of the partially illuminated detectors are nearly equal to one another. Neglecting the differences therebetween, the received intensities on the vertically disposed polarized detector 51 ($I_{d2m}$) and the horizontally disposed unpolarized detector 53 ($I_{d3m}$) may be determined through solution of the following equations (intensity received at the fully illuminated center detector 49 is described by the identifier $I_{d1m}$):

$$[I_{d1m}] = \begin{bmatrix} k_t \cdot I_{t1} \\ k_t \cdot I_{t2} \\ k_t \cdot I_{t3} \end{bmatrix}$$

where $k_t$ is a transmissivity constant. For small angular differences between transmitters and detectors, the areas of illumination of the partially illuminated detectors is nearly equal. Neglecting the differences, the received intensities on polarized detector D2 (51) and unpolarized detector D3 (53) are $$[I_{d2m}] = \begin{bmatrix} k_t \cdot I_{t1} \cdot \cos^2(\Theta_{d2} - \Theta_{roll} - \Theta_{t1}) \cdot (1 + k_d \cdot \Theta_{el}) \\ k_t \cdot I_{t2} \cdot \cos^2(\Theta_{d2} - \Theta_{roll} - \Theta_{t2}) \cdot (1 + k_d \cdot \Theta_{el}) \\ k_t \cdot I_{t3} \cdot \cos^2(\Theta_{d2} - \Theta_{roll} - \Theta_{t3}) \cdot (1 + k_d \cdot \Theta_{el}) \end{bmatrix}$$

$$[I_{d3m}] = \begin{bmatrix} k_t \cdot I_t \cdot (1 + k_d \cdot \Theta_{az}) \\ k_t \cdot I_t \cdot (1 + k_d \cdot \Theta_{az}) \\ k_t \cdot I_t \cdot (1 + k_d \cdot \Theta_{az}) \end{bmatrix}$$

where $K_d$ is a detector angular responsivity constant. Normalizing D2 and D3 intensities by dividing by D1 intensities $$[I_{d2m_N}] = \begin{bmatrix} \cos^2(\Theta_{d2} - \Theta_{roll} - \Theta_{t1}) \cdot (1 + k_d \cdot \Theta_{el}) \\ \cos^2(\Theta_{d2} - \Theta_{roll} - \Theta_{t2}) \cdot (1 + k_d \cdot \Theta_{el}) \\ \cos^2(\Theta_{d2} - \Theta_{roll} - \Theta_{t3}) \cdot (1 + k_d \cdot \Theta_{el}) \end{bmatrix}$$

$$[I_{d3m_N}] = \begin{bmatrix} 1 + k_d \cdot \Theta_{az} \\ 1 + k_d \cdot \Theta_{az} \\ 1 + k_d \cdot \Theta_{az} \end{bmatrix}$$

Roll is calculated from three functions derived by dividing normalized intensities of D2, $$\frac{I_{d2t1_N}}{I_{d2t2_N}} = \frac{\cos^2(\Theta_{d2} - \Theta_{roll} - \Theta_{t1})}{\cos^2(\Theta_{d2} - \Theta_{roll} - \Theta_{t2})}$$

$$\frac{I_{d2t1_N}}{I_{d2t3_N}} = \frac{\cos^2(\Theta_{d2} - \Theta_{roll} - \Theta_{t1})}{\cos^2(\Theta_{d2} - \Theta_{roll} - \Theta_{t3})}$$

$$\frac{I_{d2t2_N}}{I_{d2t3_N}} = \frac{\cos^2(\Theta_{d2} - \Theta_{roll} - \Theta_{t2})}{\cos^2(\Theta_{d2} - \Theta_{roll} - \Theta_{t3})}$$

With roll having been calculated, elevation is calculated from the normalized D2 equations and the azimuth is calculated from the normalized D3 equations (D2 corresponds to the detector 51 and D3 corresponds to the detector 53). Position is determined by Six measuring the time of arrival of the three laser beams on the detector D1 (reference numeral 49) and comparing to timing marks (not shown) on the shaft 21 between the drive means for rotating the sources 25, 27 and 29 and the sources themselves. When determining position, the planes of the three laser beams are observed to determine the point of intersection on the detector 49.

In the embodiment of FIGS. 1 and 3, it is preferred that all three laser beams be polarized in the manner described in FIG. 2. However, if desired, two polarized beams may be employed with the third beam being either unpolarized or circularly polarized. In such event, roll equations are derived from the combination of polarized and unpolarized responses on the detector 51 (D2). Azimuth and elevation are computed using the equations set forth above.

In the embodiment of movable sensor 60 illustrated in FIG. 5, one polarized detector 65 (D1) is employed and, in this arrangement, three polarized laser beams are preferred or, at least, two polarized beams with one that is either unpolarized or circularly polarized. In either event, the unpolarized detectors 66 (D2) and 67 (D3) are used to compute position and intensity for normalization of beam intensities, Roll is computed using the detector 65 and azimuth is subsequently computed using the detectors 65 and 66 with elevation being computed using the detectors 65 and 67.

Neglecting differences in source position, the transmit beam intensities as measured on D2 and D3 are:

$$[I_{d2tn}] = \begin{bmatrix} k_t \cdot I_{t1} \cdot (1 + k_d \cdot \Theta_{el}) \\ k_t \cdot I_{t2} \cdot (1 + k_d \cdot \Theta_{el}) \\ k_t \cdot I_{t3} \cdot (1 + k_d \cdot \Theta_{el}) \end{bmatrix}$$

$$[I_{d3tn}] = \begin{bmatrix} k_t \cdot I_{t1} \cdot (1 + k_d \cdot \Theta_{az}) \\ k_t \cdot I_{t2} \cdot (1 + k_d \cdot \Theta_{az}) \\ k_t \cdot I_{t3} \cdot (1 + k_d \cdot \Theta_{az}) \end{bmatrix}$$

from which the normalized beam intensities are calculated. Normalizing to transmit beam 1, the 2nd and 3rd beam intensities are solved from the above equations in redundancy $$\frac{I_{t2}}{I_{t1}} = \left[\frac{I_{d2t2}}{I_{d2t1}}\right]$$

$$\frac{I_{t2}}{I_{t1}} = \left[\frac{I_{d3t2}}{I_{d3t1}}\right]$$

$$\frac{I_{t3}}{I_{t1}} = \left[\frac{I_{d2t3}}{I_{d2t1}}\right]$$

$$\frac{I_{t3}}{I_{t1}} = \left[\frac{I_{d3t3}}{I_{d3t1}}\right]$$

The center polarized detector D1 has intensities according to the roll angle of the sensor and roll angle of the polarized beams $$[I_{d1tn}] = \begin{bmatrix} k_t \cdot I_{t1} \cdot \cos^2(\Theta_{d1} - \Theta_{roll} - \Theta_{t1}) \\ k_t \cdot I_{t2} \cdot \cos^2(\Theta_{d1} - \Theta_{roll} - \Theta_{t2}) \\ k_t \cdot I_{t3} \cdot \cos^2(\Theta_{d1} - \Theta_{roll} - \Theta_{t3}) \end{bmatrix}$$

Substituting for transmit intensities three equations are derived using relative transmit intensities from D2

$$\frac{I_{d1t1}}{I_{d1t2}} = \frac{I_{d2t1}}{d2t2} \cdot \frac{\cos^2(\Theta_{d1} - \Theta_{roll} - \Theta_{t1})}{\cos^2(\Theta_{d1} - \Theta_{roll} - \Theta_{t2})}$$

$$\frac{I_{d1t1}}{I_{d1t3}} = \frac{I_{d2t1}}{d2t3} \cdot \frac{\cos^2(\Theta_{d1} - \Theta_{roll} - \Theta_{t1})}{\cos^2(\Theta_{d1} - \Theta_{roll} - \Theta_{t3})}$$

$$\frac{I_{d1t2}}{I_{d1t3}} = \frac{I_{d2t2}}{d2t3} \cdot \frac{\cos^2(\Theta_{d1} - \Theta_{roll} - \Theta_{t2})}{\cos^2(\Theta_{d1} - \Theta_{roll} - \Theta_{t3})}$$

and similarly using D3 to relate transmit intensities $$\frac{I_{d1t1}}{I_{d1t2}} = \frac{I_{d3t1}}{d3t2} \cdot \frac{\cos^2(\Theta_{d1} - \Theta_{roll} - \Theta_{t1})}{\cos^2(\Theta_{d1} - \Theta_{roll} - \Theta_{t2})}$$

$$\frac{I_{d1t1}}{I_{d1t3}} = \frac{I_{d3t1}}{d3t3} \cdot \frac{\cos^2(\Theta_{d1} - \Theta_{roll} - \Theta_{t1})}{\cos^2(\Theta_{d1} - \Theta_{roll} - \Theta_{t3})}$$

$$\frac{I_{d1t2}}{I_{d1t3}} = \frac{I_{d3t2}}{d3t3} \cdot \frac{\cos^2(\Theta_{d1} - \Theta_{roll} - \Theta_{t2})}{\cos^2(\Theta_{d1} - \Theta_{roll} - \Theta_{t3})}$$

From these equations roll can be solved for and the absolute beam intensities can be determined. The elevation and azimuth is then solved using absolute beam intensities and intensities from D2 and D3 intensity equations.

Where the movable sensor employed is that which is designated by the reference numeral 70 and illustrated in FIG. 6, two polarized detectors 76 and 77 are employed. This arrangement requires three laser beams, one of which is required to be polarized. The unpolarized or circularly polarized beam is used to determine azimuth from measurements taken by the detectors 75 (D1) and 76 (D2). Roll is determined using polarized and unpolarized responses on the detectors 76 (D2) and 77 (D3).

It is contemplated, in accordance with the teachings of the present invention, that it is possible to fully determine the position and orientation of the movable sensor in six degrees of freedom using three scanning beam light sources and a sensor with as few as three detector elements, one of which is polarized to permit orientation determination. It is also possible to determine the orientation of the sensor with one scanning beam light source but with additional polarized detector elements to sense the plane of polarization of impinging light. One polarized beam is sufficient to allow the user to determine orientation, but three polarized beams are required for position determination.

FIG. 14 shows an embodiment described above wherein the sensor consists of a movable sensor 151 including three detectors and an auxiliary detector 153. The sensors D1 and D3 of the detector 151 are separated by a known distance L from the auxiliary detector 153 and knowledge of this distance L is sufficient to resolve a position vector connecting position rays to each detector once orientation has been determined. To compute elevation and azimuth, the detectors D1 and D2 are employed. This system only requires two unpolarized beams to determine position and orientation if the distance between the detectors is known. Regarding the system of FIG. 14, position rays are determined from beam times of arrival on detector D1 and auxiliary detector D4 from which roll is determined. Azimuth is determined from intensities of light received at the detectors D1 and D3 and elevation is determined from measurements taken by the detectors D1 and D2. With sensor orientation determined, the sensor position is determined from position rays to detectors D1 and D4 and known distance between detectors D1 and D4.

A further modification 158 is illustrated in FIG. 15 including a movable sensor 160 having two detectors 161 (D1) and 163 (D3). An auxiliary sensor 164 includes a detector 162 (D2). The detectors D2 and D3 are separated by a known distance L sufficient to resolve a position vector connecting position rays to each detector. The detector D1 (161) is used to compute azimuth. The FIG. 15 system only requires two beams, neither of which are required to be polarized, to determine position and orientation, if the distance between detectors D1 and D2 is known. Regarding the system of FIG. 14, position rays are determined from beam times of arrival on detector D1 and auxiliary detector (D2) from which roll is determined. Azimuth is determined from intensities of detectors D1 and D3 and elevation is determined from detectors D1 and D2. With sensor orientation determined, the sensor position is determined from position rays to detectors D1 and D2 and known distance between detectors D1 and D2.

Figure 18:
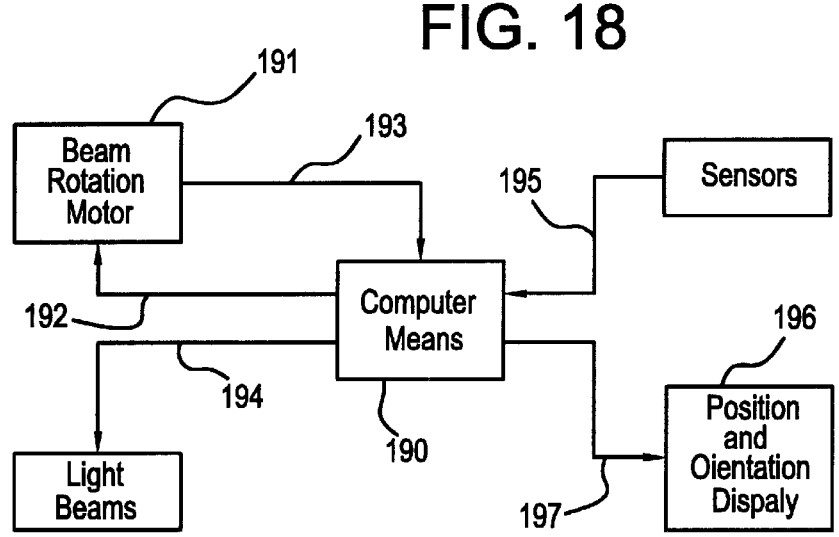
FIG. 18 shows a schematic representation of the electrical circuitry of the present invention.
Figure 19:
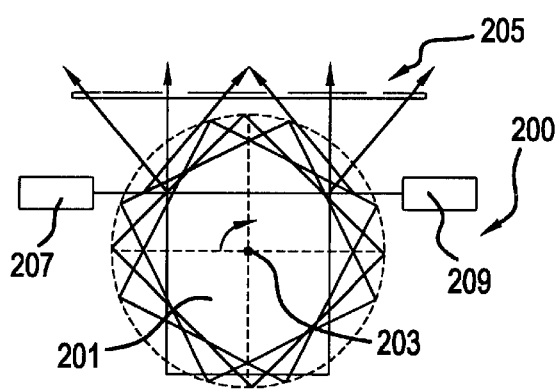
FIG. 19 shows a top view an alternative construction for a light source depicting two vertical beams.

With reference to FIG. 18, a schematic representation of the electrical circuitry of the present invention is shown. The electrical circuitry includes computer means 190 which may be of any known type. The computer means 190 controls rotation of the beam rotation motor 191 through the electrical conductor 192. The electrical conductor 193 feeds signals to the computer means 190 from the beam rotation motor 191 indicative of the speed of rotation of the motor 191 so that the computer means can keep track of the speed of rotation of the motor 191.

The light beams are controlled by the computer means 190 via an electrical conductor 194. When the sensors disclosed in the various embodiments hereinabove sense light from the light beams, in a manner well known to those skilled in the art, electrical signals result which are conveyed to the computer means 190 by the multiconductor electrical conductor 195. The computer means 190 performs calculations of position and orientation as explained hereinabove and feeds display signals to a position and orientation display 196 via the multiconductor electrical conductor 197. In this way, position and orientation of a point within a prescribed space may be calculated and displayed.

In accordance with the teachings of the present invention, alternative constructions may be employed for the light source other than the specific structure depicted in FIG. 1. FIGS. 19–22 depict a first alternative light source generally designated by the reference numeral 200 and including a four-sided polygonal mirror 201 rotating about a vertical axis of rotation 203. An optical window 205 is placed in front of the mirror 201.

Figure 20:
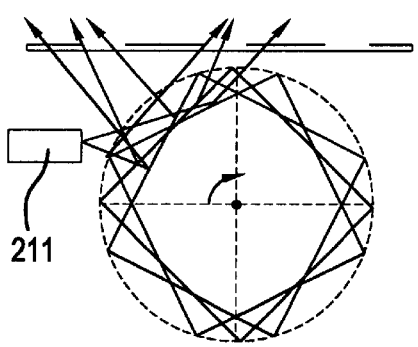
FIG. 20 shows a top view of the source of FIG. 19 but also showing a skewed beam.
Figure 21:
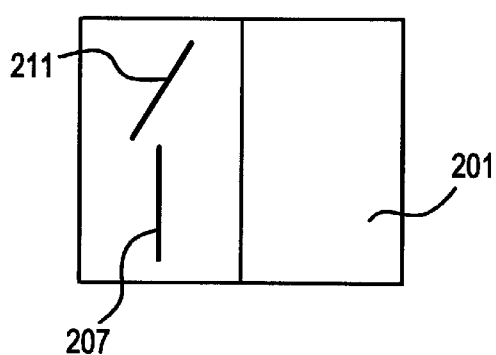
FIG. 21 shows a left-side view of the light source of FIGS. 19 and 20.
Figure 22:
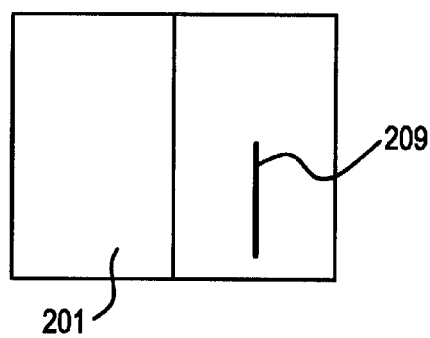
FIG. 22 shows a right-side view of the light source of FIGS. 19 and 20.

To either side of the polygonal mirror 201, vertical beam sources 207 and 209 are located. With particular reference to FIGS. 20 and 21, above the vertical beam source 207, a skewed beam source 211 is located. In the preferred embodiment, the skewed beam source 211 is skewed 60° with respect to the orientation of the beam source 207.

As should be understood from FIGS. 19–22, fan-shaped light beams emanate from the beam sources 207, 209 and 211, which beams scan across a prescribed space in a known pattern based upon the shape of the mirror 201 and its speed of rotation, both of which are known. Detectors such as those described with reference to FIGS. 1–18 sense the locations of the three fan-shaped light beams emanating from the beam sources 207, 209 and 211 and with knowledge of the position of the shaft defining the axis 203 and the polygonal geometry of the mirror 201, calculation may be carried out of the three detected beam plane positions to allow determination of the position of the detector.

Figure 23:
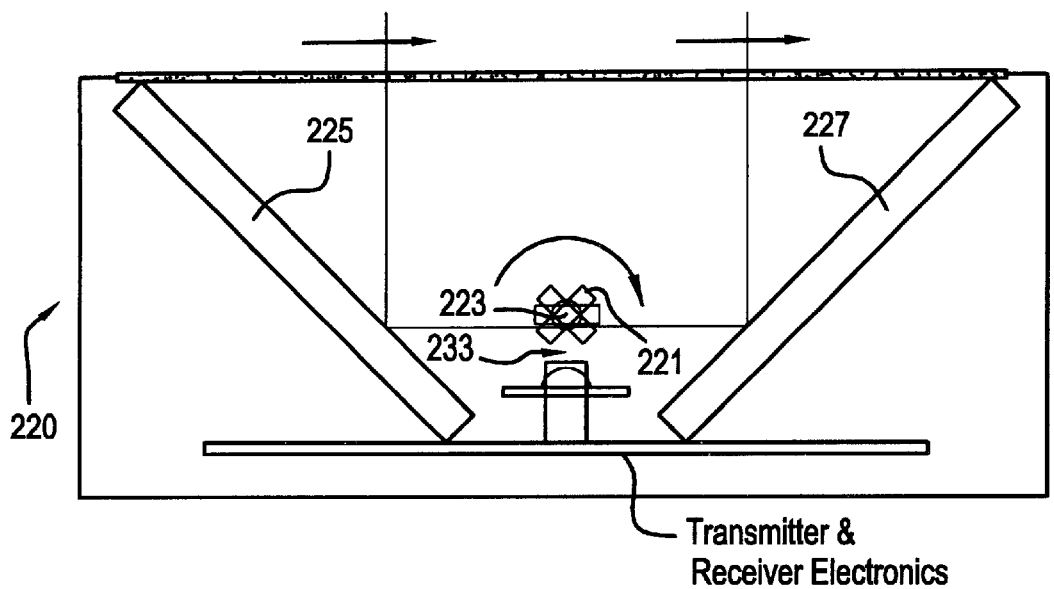
FIG. 23 shows a top view of a further alternative construction for a light source in accordance with the teachings of the present invention.
Figure 24:
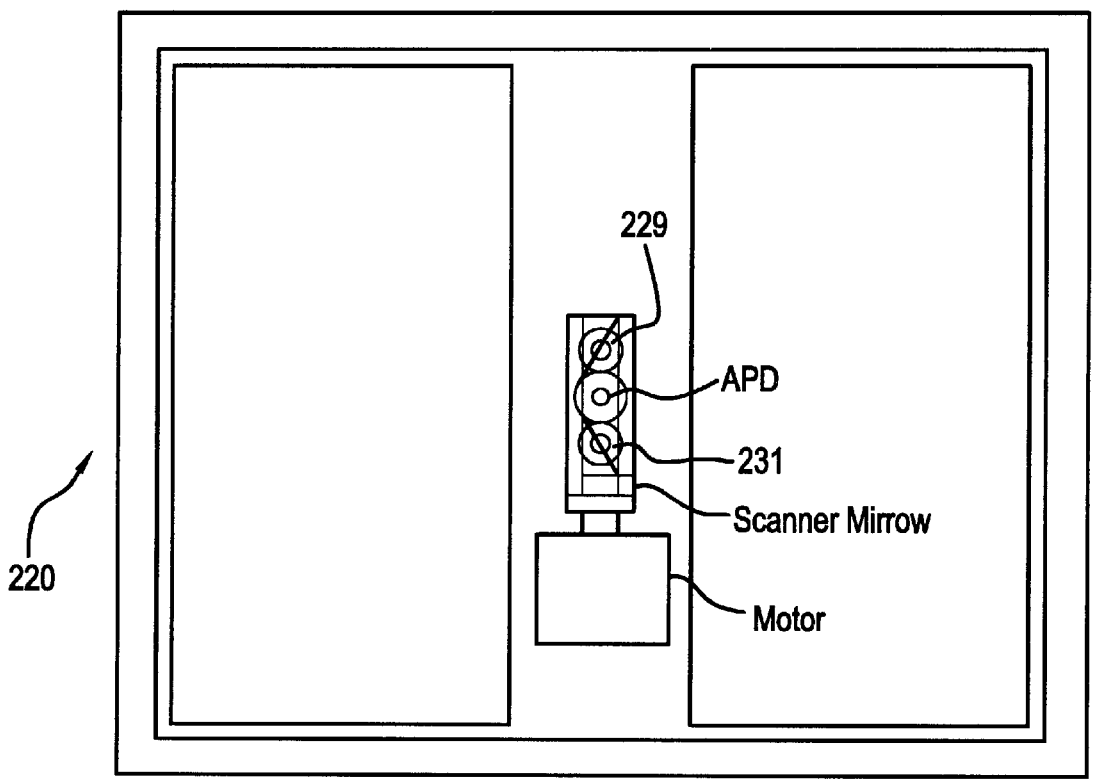
FIG. 24 shows a front view of the embodiment of FIG. 23.

With reference, now, to FIGS. 23 and 24, a further alternative light source is generally designated by the reference numeral 220 and is seen to include a two-sided mirror 221 rotating about an axis of rotation 223. Stationary mirrors 225 and 227 are orthogonal to one another. Two beam sources 229 and 231 are angled with respect to one another with, for example, the source 229 being angled upwardly 30° from horizontal and with the source 231 angled downwardly 30° from horizontal.

With reference to FIG. 23, beams of light emanate from the sources 229 and 231 in the direction of the arrow 233. The rotating mirror 221 reflects the beam from each source alternately in the left-hand and right-hand directions so that light from each source 229, 231 impinges alternately off of the stationary mirrors 225 and 227. With two sources 229 and 231 being employed, this means that four fan-shaped light beams are generated, two for each source.

Detectors such as those described in accordance with FIGS. 1–18 sense the four fan-shaped light beams, and with knowledge of the position of the shaft defining the axis 223 and the geometry of the stationary and rotating mirrors, calculation of the positions of the four beams may be had so that position of a detector may be determined.

Accordingly, an invention has been disclosed in terms of preferred embodiments thereof, which fulfill each and every one of the objects of the invention as set forth hereinabove and provide a new and useful system for position and orientation determination of a point in space using scanning laser beams of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A system for position and orientation measurement of a point in a prescribed space, comprising:
   a) a source of light including three scanning, non-coplanar fan-shaped rotating light beams, each beam having known position and orientation at any particular time;
   b) at least two of said light beams being uniquely polarized at angles of polarization different from one another;
   c) a sensor device movable within said space and carrying sensor means for sensing said light beams;
   d) said sensor means comprising three separate detectors including:
      i) a first detector always exposed to light from said light beams;
      ii) second and third detectors at least partially exposed to light from said light beams; and
      iii) one of said three detectors being polarized at a particular angle of polarization; and
   e) computer means for receiving signals from said detectors and, therefrom, measuring position and orientation of said point.

2. The system of claim 1, wherein said at least two of said light beams are polarized at 0° and 45°, respectively.

3. The system of claim 1, wherein said at least two of said light beams are polarized at 0° and 90°, respectively.

4. The system of claim 1, wherein said at least two of said light beams are polarized at 45° and 90°, respectively.

5. The system of claim 1, wherein said at least two of said light beams are parallel.

6. The system of claim 1, wherein said at least two of said light beams are skewed with respect to one another at a skew angle.

7. The system of claim 6, wherein said skew angle is 60°.

8. The system of claim 1, wherein said sensor device includes an apertured plate in front of said detectors.

9. The system of claim 1, wherein said first detector is unpolarized.

10. The system of claim 1, wherein said first detector is polarized.

11. The system of claim 10, wherein said first detector is polarized at a polarization angle of 90°.

12. The system of claim 1, wherein said second detector is unpolarized.

13. The system of claim 1, wherein said second detector is polarized.

14. The system of claim 13, wherein said second detector is polarized at a polarization angle of 90°.

15. The system of claim 1, wherein said third detector is unpolarized.

16. The system of claim 1, wherein said third detector is polarized.

17. The system of claim 1, wherein said third detector is polarized at a polarization angle of 45°.

18. The system of claim 17, wherein said third detector is polarized at a polarization angle of 90°.

19. The system of claim 17, wherein said sensor device includes an apertured plate in front of said detectors.

20. The system of claim 19, wherein said apertured plate has a polarizing filter therein overlying said third detector.

21. The system of claim 1, further including an auxiliary detector separate from said sensor device.

22. The system of claim 1, wherein said sensor device includes a first housing carrying said first and third detectors and a second housing carrying said second detector.

23. The system of claim 1, wherein each of said detectors includes a four quadrant position sensing detector.

24. The system of claim 23, wherein each of said detectors includes a focusing lens.

25. The system of claim 24, wherein said focusing lens is spherical.

26. The system of claim 1, wherein each of said detectors includes two orthogonally related single axis position sensing detectors.

27. The system of claim 26, wherein each single axis position sensing detector has a cylindrical focusing lens.

28. The system of claim 1, wherein each detector includes a cover plate having a plurality of parallel slots.

29. The system of claim 1, wherein a third one of said light beams is unpolarized.

30. The system of claim 1, wherein a third one of said light beams is circularly polarized.

31. The system of claim 2, wherein a third one of said light beams is polarized.

32. The system of claim 31, wherein said third one of said light beams is polarized at a polarization angle of 90°.

33. The system of claim 1, wherein said first detector is located on said sensor device to facilitate measurement of position and light beam intensity for normalization.

34. The system of claim 33, wherein said second detector is located on said sensor device to facilitate measurement of roll and pitch.

35. The system of claim 34, wherein said third detector is located on said sensor device to facilitate measurement of yaw.

36. The system of claim 1, wherein said first detector is located on said sensor device to facilitate measurement of roll.

37. The system of claim 36, wherein said second detector is located on said sensor device to facilitate measurement of position and beam intensity.

38. The system of claim 37, wherein said third detector is located on said sensor device to facilitate measurement of position and beam intensity.

39. The system of claim 1, wherein said first detector is located on said sensor device to facilitate measurement of azimuth.

40. The system of claim 39, wherein said second detector is located on said sensor device to facilitate measurement of roll and azimuth.

41. The system of claim 40, wherein said third detector is located on said sensor device to facilitate measurement of roll.

42. The system of claim 1, wherein said second detector is located on said sensor device to facilitate measurement of elevation.

43. The system of claim 42, wherein said third detector is located on said sensor device to facilitate measurement of roll and azimuth.

44. The system of claim 1, wherein said source of light includes stationary light sources and a rotating mirror.

45. The system of claim 1, wherein said source of light includes rotating light sources.

46. A system for position and elevation measurement of a point in a prescribed space, comprising:
   a) a source of light including three scanning, non-coplanar fan-shaped rotating light beams, each beam having known position and orientation at any particular time;
   b) at least two of said light beams being uniquely polarized at angles of polarization different from one another;
   c) a sensor device movable within said space and carrying sensor means for sensing said light beams;
   d) said sensor means comprising two separate detectors including:
      i) a first detector always exposed to light from said light beams; and
      ii) a second detector at least partially exposed to light from said light beams and polarized at a particular angle of polarization; and
   e) computer means for receiving signals from said detectors and, therefrom, measuring position and orientation of said point.

47. The system of claim 46, wherein said second detector is polarized at an angle of 90°.

48. The system of claim 46, wherein said first detector is located on said sensor device to facilitate measurement of position.

49. The system of claim 48, wherein said second detector is located on said sensor device to facilitate measurement of elevation.

50. The system of claim 46, wherein said first detector is located on said sensor device to facilitate measurement of position and light beam intensity for normalization.

51. The system of claim 50, wherein said second detector is located on said sensor device to facilitate measurement of elevation and roll.

52. A system for position and orientation measurement of a point in a prescribed space, comprising:
   a) a source of light including three scanning, non-coplanar fan-shaped rotating light beams, at least two of said beams having spaced sources and at least one of said beams being skewed with respect to an axis of rotation thereof, each beam having known position and orientation at any particular time;
   b) at least one of said light beams being uniquely polarized at a particular angle of polarization and at least one other beam being either unpolarized or circularly polarized;
   c) a sensor device movable within said space and carrying sensor means for sensing said light beams;
   d) said sensor means comprising three separate detectors including:
      i) a first detector always exposed to light from said light beams;
      ii) second and third detectors at least partially exposed to light from said light beams; and
      iii) two of said detectors being polarized at different angles of polarization; and
   e) computer means for receiving signals from said detectors and, therefrom, measuring position and orientation of said point.

53. A system for position and at least one angle of orientation measurement of a point in a prescribed space, comprising:
   a) a source of light including three scanning, non-coplanar fan-shaped beams, at least two beams having separated sources and at least one beam being skewed with respect to an axis of rotation thereof, each beam having known position and orientation at any particular time;
   b) a sensor device movable in said space and carrying sensor means for sensing said light beams;
   c) said sensor means comprising a position sensing detector; and
   d) computer means for receiving signals from said position sensing detector and, therefrom, measuring position and orientation of said point, said computer means including means for measuring angle of incidence of said beams and, therefrom, measuring orientation of said sensor device.

54. The system of claim 53, wherein a focusing lens overlies said position sensing detector.

55. The system of claim 54, wherein said focusing lens is spherical.

56. The system of claim 53, wherein said sensor means includes two orthogonally related single axis position sensing detectors.

57. The system of claim 56, wherein each single axis position sensing detector has a cylindrical focusing lens.

58. The system of claim 53, wherein said sensor means has a cover plate including a plurality of slits.

59. The system of claim 53, wherein said position sensing detector is used to measure position, elevation and azimuth, and an auxiliary detector is added at a distance from the position sensing detector to measure position and using the positions of said position sensing detectors to calculate roll.

60. The system of claim 53, wherein the position sensing detector is used to measure position and azimuth and an auxiliary position sensing detector is added at a distance from the position sensing detector to measure elevation and position, and using the positions of the two position sensing detectors' position to calculate roll.

* * * * *